United States Patent
McGovern et al.

(10) Patent No.: US 11,421,193 B2
(45) Date of Patent: Aug. 23, 2022

(54) LOSS REDUCTION IN BEVERAGE LOADING AND UNLOADING OF WATER REMOVAL SYSTEMS

(71) Applicant: Sandymount Technologies Corporation, Woburn, MA (US)

(72) Inventors: Ronan K. McGovern, Cambridge, MA (US); Grace Connors, Cambridge, MA (US); Adam M. Weiner, Cambridge, MA (US)

(73) Assignee: Alfa Laval Copenhagen A/S, Soborg (DK)

( * ) Notice: Subject to any disclaimer, the term of this patent is extended or adjusted under 35 U.S.C. 154(b) by 297 days.

(21) Appl. No.: 16/770,765

(22) PCT Filed: Dec. 7, 2018

(86) PCT No.: PCT/US2018/064612
§ 371 (c)(1),
(2) Date: Jun. 8, 2020

(87) PCT Pub. No.: WO2019/113544
PCT Pub. Date: Jun. 13, 2019

(65) Prior Publication Data
US 2021/0163863 A1 Jun. 3, 2021

Related U.S. Application Data

(60) Provisional application No. 62/646,123, filed on Mar. 21, 2018, provisional application No. 62/596,435, filed on Dec. 8, 2017.

(51) Int. Cl.
*C12H 6/00* (2019.01)
*B01D 61/02* (2006.01)
(Continued)

(52) U.S. Cl.
CPC ............ *C12H 6/00* (2019.02); *B01D 61/022* (2013.01); *B01D 61/025* (2013.01); *B01D 61/08* (2013.01);
(Continued)

(58) Field of Classification Search
CPC ............ B01D 2311/08; B01D 2311/25; B01D 2311/2649; B01D 2313/143;
(Continued)

(56) References Cited

U.S. PATENT DOCUMENTS

| 4,792,402 A | 12/1988 | Fricker |
| 8,506,815 B2 * | 8/2013 | Nemser ............... B01D 61/362 95/52 |

(Continued)

FOREIGN PATENT DOCUMENTS

| WO | WO2016/081399 | 5/2016 |
| WO | 2016/210337 A2 | 12/2016 |

(Continued)

OTHER PUBLICATIONS

ISA/US, Commissioner for Patents; International Search Report and Written Opinion dated Feb. 27, 2019 for PCT Application No. PCT/US18/64612 (19 pages).
(Continued)

*Primary Examiner* — Terry K Cecil
(74) *Attorney, Agent, or Firm* — Sunstein LLP

(57) ABSTRACT

A method for reducing beverage loss during loading of beverage into an ethanol concentration system having a set of reverse osmosis pressure vessels, each pressure vessel having a feed inlet, a retentate outlet, and a permeate outlet. The method includes feeding deaerated water into the feed inlet of a first pressure vessel, feeding the beverage into the feed inlet of the first pressure vessel, monitoring an alcohol percentage at the retentate outlet of a second pressure vessel,
(Continued)

the second pressure vessel coupled directly or indirectly to the first pressure vessel, and coupling a retentate from the retentate outlet of the second pressure vessel to a feed tank coupled to the feed inlet of the first pressure vessel when the alcohol percentage is within a first target range of 0.5 to 18% alcohol-by-volume (ABV).

15 Claims, 8 Drawing Sheets

(51) Int. Cl.
| | | |
|---|---|---|
| *B01D 61/08* | (2006.01) | |
| *B01D 61/12* | (2006.01) | |
| *C02F 1/00* | (2006.01) | |
| *C02F 1/44* | (2006.01) | |
| *C12C 11/11* | (2019.01) | |
| *C12G 1/00* | (2019.01) | |
| *C12G 3/08* | (2006.01) | |
| *C02F 103/32* | (2006.01) | |

(52) U.S. Cl.
CPC .............. *B01D 61/12* (2013.01); *C02F 1/001* (2013.01); *C02F 1/008* (2013.01); *C02F 1/441* (2013.01); *C12C 11/11* (2013.01); *C12G 1/00* (2013.01); *C12G 3/08* (2013.01); *B01D 2311/08* (2013.01); *B01D 2311/25* (2013.01); *B01D 2311/2649* (2013.01); *B01D 2313/143* (2013.01); *B01D 2317/022* (2013.01); *C02F 2103/325* (2013.01)

(58) Field of Classification Search
CPC ............ B01D 2317/022; B01D 61/022; B01D 61/025; B01D 61/08; B01D 61/12; C02F 1/001; C02F 1/008; C02F 1/441; C02F 2103/325; C02F 2209/02; C02F 2209/03; C12C 11/11; C12G 1/00; C12G 3/08; C12H 3/04; C12H 6/00
See application file for complete search history.

(56) References Cited

U.S. PATENT DOCUMENTS

2012/0283489 A1    11/2012  Nemser et al.
2016/0136577 A1*    5/2016  McGovern ........... B01D 61/022
                                               210/652

FOREIGN PATENT DOCUMENTS

WO    WO2018/119460    6/2018
WO    WO2018/237015    12/2018

OTHER PUBLICATIONS

European Patent Office, Extended European Search report for EP application No. 18886410.2, dated Aug. 9, 2021 (6 pages).

* cited by examiner

LOSS REDUCTION IN BEVERAGE LOADING AND UNLOADING OF WATER REMOVAL SYSTEMS

CROSS-REFERENCE TO RELATED APPLICATIONS

This patent application is a national phase entry of International Application No. PCT/US2018/064612, filed Dec. 7, 2018, and claims priority from U.S. Provisional Application No. 62/596,435, filed Dec. 8, 2017, and U.S. Provisional Application No. 62/646,123, filed Mar. 21, 2018, the disclosures of which are incorporated by reference herein in their entirety.

TECHNICAL FIELD

The present invention relates to ethanol concentration methods and systems, and more particularly to reducing loss in the beverage loading and unloading in ethanol concentration systems.

SUMMARY OF THE EMBODIMENTS

In accordance with one embodiment of the invention, a reverse osmosis filtration system includes a set of at least 5 reverse osmosis pressure vessels coupled in series, each pressure vessel having one to eight reverse osmosis membrane elements.

In a related embodiment, the set includes up to 25 reverse osmosis pressure vessels. Optionally, each pressure vessel has three or four reverse osmosis membrane elements. Optionally, each reverse osmosis membrane element is spiral wound.

In another related embodiment, each reverse osmosis membrane element is 37 to 43 inches in length. Optionally, the filtration system is configured to filter ethanol from alcoholic beverages. In yet another related embodiment, each pressure vessel has a feed inlet, a retentate outlet, and a permeate outlet, the pressure vessels being coupled so that each successive pressure vessel has its feed inlet coupled to the retentate outlet of its preceding vessel.

In another related embodiment, the permeate outlet of a last pressure vessel in the set is also coupled to the feed inlet of a first pressure vessel in the set to provide a recycling flow path. Optionally, the system includes a first pass unit having a first stage unit and second stage unit, wherein the set of at least 5 filtration vessels are distributed between the first and second stage units. In a related embodiment, the permeate outlet is a front permeate outlet and the pressure vessel also has a back permeate outlet and wherein the back permeate outlet of one pressure vessel is coupled to the front permeate outlet of a successive pressure vessel.

In yet another related embodiment, the feed inlet of a first one of the set of at least 5 pressure vessels is coupled to a high-pressure pump. Optionally, an inlet of the high-pressure pump is coupled to a heat exchanger. Optionally, an inlet of the heat exchanger is coupled to a low-pressure pump. In another related embodiment, the permeate outlet of a first one of the set of at least 5 filtration vessel is coupled to a high-pressure pump. Optionally, the pump is coupled to an inlet of one of an additional set of reverse osmosis pressure vessels, each of pressure vessels of the additional set coupled in series to each other.

In another related embodiment, the system includes a set of cleaning inlets coupled to a cleaning tank, each cleaning inlet coupled in parallel to a feed inlet or retentate outlet of a first end of a corresponding one of the set of pressure vessels. Optionally, the system includes a set of cleaning outlets, each cleaning outlet coupled in parallel to a feed inlet or retentate outlet of a second end of a corresponding one of the set of pressure vessels. Optionally, the system includes a low-pressure pump coupled to set of cleaning inlets. In yet another related embodiment, a permeate outlet of an intermediate one of the set of at least 5 pressure vessels is coupled to the feed inlet of a first of the set of at least 5 pressure vessels.

In yet another related embodiment, the system includes at least one back-flow preventor configured to prevent a reverse surge of permeate through the one or more reverse osmosis membrane elements.

In accordance with another embodiment of the invention, a method for reducing beverage loss during loading of beverage into an ethanol concentration system is provided. The ethanol concentration system includes a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel. The method includes feeding deaerated water into the feed inlet of a first pressure vessel of the set of reverse osmosis pressure vessels, and optionally having a deaerated water retentate from the retentate outlet of the first vessel directed to a drain. The method further includes feeding beverage into the feed inlet of the first pressure vessel, and monitoring an alcohol percentage at a retentate outlet of a second pressure vessel of the set of reverse osmosis pressure vessels. The second pressure vessel can be coupled directly or indirectly to the first pressure vessel. The method further includes coupling a retentate from the retentate outlet of the second pressure vessel to a feed tank coupled to the feed inlet of the first pressure vessel when the alcohol percentage is within a first target range of 0.5 to 18% alcohol-by-volume (ABV).

In related embodiments, the method may further include filtering sediment going into the feed inlet of the first pressure vessel and/or out from the retentate outlet of the second pressure vessel. The deaerated water may be cooled to a temperature of 0° C. to 10° C. before being fed to the feed inlet of the first pressure vessel The method may further include pressurizing the ethanol concentration system during the coupling process. The pressurizing may be in a pressure range of 500 psi to 3,000 psi, preferably 1,000 psi to 2,000 psi.

In another embodiment, the deaerated water fed to the feed inlet of the first vessel is first passed through a heat exchanger to be cooled to between 0 degrees Celsius and 10 degrees Celsius, or more preferably, between 1 degree Celsius and 3 degrees Celsius.

The method may further include obtaining the retentate from the retentate outlet of the second pressure vessel when the alcohol percentage is in a second target range, the second target range different from the first target range. The second target range may be 15-25% ABV for a beer beverage and 20-30% ABV for a wine beverage.

The obtaining may include directing the retentate to a product tank coupled to the retentate outlet of the second pressure vessel. Each of the reverse osmosis pressure vessels may further include a filter membrane therein, the filter membrane including membrane leaves separated by a spacer having a thickness of between about 0.0015 to about 0.027 inches or a thickness of between about 0.010 inches to about 0.027 inches. The spacer may include printed dots, lines and/or patterns formed on a surface of the membrane leaves.

In this case, the spacer may have a thickness of between about 0.0015 inches to about 0.020 inches. The monitoring may further include using one or more sensors to determine the alcohol percentage and/or a real extract percentage. The one or more sensors may include an inline sound velocity sensor, an inline refractive index sensor, an inline near infrared sensor, and/or an inline density sensor. The monitoring may further include using a thermocouple. The ethanol concentration system may include removal of water from the beverage.

In accordance with another embodiment of the invention, a method for reducing beverage loss during loading of beverage into an ethanol concentration system is provided. The ethanol concentration system includes a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel. The method includes feeding deaerated water into the feed inlet of a first pressure vessel of the set of reverse osmosis pressure vessels, and optionally having a deaerated water retentate from the retentate outlet of the first pressure vessel directed to a drain. The method further includes feeding beverage into the feed inlet of the first pressure vessel, and monitoring an alcohol percentage at a retentate outlet of a second pressure vessel of the set of reverse osmosis pressure vessels. The second pressure vessel can be coupled directly or indirectly to the first pressure vessel. The method further includes blocking at least a portion of the retentate outlet of the second pressure vessel, such that flow of retentate from the outlet of the second pressure vessel is about 0% to 25% of the flow of feed beverage fed to the inlet of the first pressure vessel, causing an increase of ethanol in the ethanol concentration system when the alcohol percentage is within a first target range of 0.5 to 18% alcohol-by-volume (ABV). Optionally, the flow of retentate from the outlet of the second pressure vessel may be recirculated to the feed inlet of the first pressure vessel.

In related embodiments, the method may further include pressurizing the ethanol concentration system to within a pressure range of 1500 psi to 3000 psi while blocking the portion of the retentate outlet of the second pressure vessel. After pressurizing the ethanol concentration system to within the pressure range, the method may further include unblocking the retentate outlet and obtaining the retentate. Obtaining the retentate may include directing the retentate to a product tank coupled to the retentate outlet. Each of the reverse osmosis pressure vessels may further include a filter membrane therein, the filter membrane including membrane leaves separated by a spacer having a thickness of between about 0.0015 to about 0.027 inches. The spacer may be a feed spacer having a thickness of between about 0.010 inches to about 0.027 inches. The spacer may include printed dots, lines or patterns formed on a surface of the membrane leaves. The spacer may have a thickness of between about 0.0015 inches to about 0.020 inches. The method may further include filtering sediment going into the feed inlet of the first pressure vessel and/or out from the retentate outlet of the second pressure vessel.

In another related embodiment, the method includes unblocking the retentate outlet and obtaining the retentate from the retentate outlet of the second pressure vessel when the alcohol percentage is in a second target range, the second target range different from the first target range. Optionally, the second target range is 15-25% ABV for a beer beverage. Optionally, or alternatively, the second target range is 20-30% ABV for a wine beverage.

In a further related embodiment, the method includes pressurizing the system to within a pressure range of 1500 psi to 3000 psi while blocking a part of the retentate outlet of the second pressure vessel. Optionally, after pressurizing the system to within the pressure range, the method includes unblocking the retentate outlet and obtaining the retentate. In some embodiments, obtaining the retentate includes directing the retentate to a product tank coupled to the retentate outlet.

In another embodiment, the deaerated water fed to the feed inlet of the first pressure vessel is first passed through a heat exchanger to be cooled to between 0° C. and 10° C., or more preferably, between 1° C. and 3° C.

In accordance with another embodiment of the invention, a method for reducing beverage loss after ceasing concentration and during unloading of beverage out of an ethanol concentration system is provided. The ethanol concentration system includes a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel. The method includes coupling the retentate outlet of a first pressure vessel of the set of reverse osmosis pressure vessels to a feed tank, the feed tank coupled to a feed inlet of a second pressure vessel of the set of reverse osmosis pressure vessels, the second pressure vessel preceding the first pressure vessel. The method further includes feeding deaerated water to the feed inlet of the second pressure vessel such that a portion of the retentate from the retentate outlet is diverted to the feed tank, the portion being in a range of 50% to 100%, and decoupling the retentate outlet from the feed tank while feeding deaerated water to the feed inlet of the second pressure vessel.

In related embodiments, the method may further include, after decoupling the retentate outlet from the feed tank, coupling the retentate outlet to a drain while feeding deaerated water to the feed inlet of the second pressure vessel. Each of the reverse osmosis pressure vessels may further include a filter membrane therein, the filter membrane including membrane leaves separated by a spacer having a thickness of between about 0.0015 to about 0.027 inches. The spacer may be a feed spacer having a thickness of between about 0.010 inches to about 0.027 inches. The spacer may include printed dots, lines or patterns formed on a surface of the membrane leaves. The spacer may have a thickness of between about 0.0015 inches to about 0.020 inches. The method may further include filtering sediment going into the feed inlet of the first pressure vessel and/or out from the retentate outlet of the second pressure vessel.

In accordance with another embodiment of the invention, a method for reducing beverage loss during unloading of beverage out of an ethanol concentration system is provided. The ethanol concentration system includes a set of reverse osmosis pressure vessels, each pressure vessel having a feed inlet, a retentate outlet, and a permeate outlet, the pressure vessels being coupled so that each successive vessel has its feed inlet coupled to the retentate outlet of its preceding vessel, The method includes feeding deaerated water to the feed inlet of a first pressure vessel of the set of reverse osmosis pressure vessels while operating the ethanol concentration system, monitoring an alcohol percentage of the retentate outlet of a second pressure vessel of the set of reverse osmosis pressure vessels, the second pressure vessel coupled directly or indirectly to the first pressure vessel, and coupling a retentate from the retentate outlet of the second pressure vessel to a feed tank coupled to the feed inlet of the first pressure vessel when the alcohol percentage is within a target range of 15 to 30% ABV.

In related embodiments, the above methods may further have each of the reverse osmosis pressure vessels including a filter membrane therein, the filter membrane including membrane leaves separated by a spacer having a thickness of between about 0.0015 to about 0.027 inches. The spacer may be a feed spacer having a thickness of between about 0.010 inches to about 0.027 inches. The spacer may include printed dots, lines or patterns formed on a surface of the membrane leaves. In this case, the spacer may have a thickness of between about 0.0015 inches to about 0.020 inches. The method may further include filtering sediment going into the feed inlet of the first pressure vessel and/or out from the retentate outlet of the second pressure vessel.

In accordance with another embodiment of the invention, an ethanol concentration system for reducing beverage loss during loading or unloading of beverage into or from the ethanol concentration system includes a set of reverse osmosis pressure vessels, each pressure vessel having a feed inlet, a retentate outlet, and a permeate outlet, the pressure vessels coupled so that each successive pressure vessel has its feed inlet coupled to the retentate outlet of its preceding pressure vessel. The system also includes a fluid line configured to be coupled to the feed inlet of a first pressure vessel of the set of reverse osmosis pressure vessels and configured to permit deaerated water into the first pressure vessel, a feed tank configured to be coupled to the feed inlet of the first pressure vessel of the set of reverse osmosis pressure vessels and configured to be coupled to or decoupled from the retentate outlet of a second pressure vessel of the set of reverse osmosis pressure vessels, the second pressure vessel coupled directly or indirectly to the first pressure vessel, one or more sensors configured to detect an alcohol percentage at the retentate outlet of the second pressure vessel, and a controller in communication with the one or more sensors and the feed tank, wherein the controller is configured (a) to allow the retentate outlet of the second pressure vessel to be coupled to the feed tank when the one or more sensors detect that the alcohol percentage is within a first target range and (b) to allow the retentate outlet of the second pressure vessel to be decoupled from the feed tank and coupled to a drain when the one or more sensors detect that the alcohol percentage is within a second target range, the second target range different from the first target range.

In related embodiments, the controller may include two or more controllers. The controller may actuate one or more valves. The one or more sensors may include an inline sound velocity sensor, an inline refractive index sensor, an inline near infrared sensor, and/or an inline density sensor. Each of the reverse osmosis pressure vessels may further include a filter membrane therein, the filter membrane including membrane leaves separated by a spacer having a thickness of between about 0.0015 to about 0.027 inches. The spacer may be a feed spacer having a thickness of between about 0.010 inches to about 0.027 inches. The spacer may include printed dots, lines and/or patterns formed on a surface of the membrane leaves. In this case, the spacer may have a thickness of between about 0.0015 inches to about 0.020 inches. The system may further include a trap filter configured to be coupled to the feed inlet of the first pressure vessel and/or the retentate outlet of the second pressure vessel, the trap filter configured to collect sediment from the beverage. In a related embodiment, the reverse osmosis filter cartridges loaded in the pressure vessels are made with feed spacer material having a thickness of 1.5 to 27 mil. In some embodiments, the feed spacer includes raised lines attached to the membrane active layer, such as achieved via 3-D printing. In some embodiments, the feed spacer material is not a continuous material but includes disconnected raised surfaces attached to the membrane active layer, such as achieved via 3-D printing. These narrower feed channels have the unexpected benefit of reducing the fluid hold-up of the system, reducing the time it takes to ramp the system pressure up to steady state, and reducing the time to load and unload the system.

In accordance with another embodiment of the invention, a method for reducing beverage loss during loading of beverage into a water removal system is provided. The water removal system includes a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel. The method includes feeding deaerated water into the feed inlet of a first pressure vessel of the set of reverse osmosis pressure vessels, feeding the beverage into the feed inlet of the first pressure vessel, monitoring an alcohol percentage and/or a real extract percentage at the retentate outlet of a second pressure vessel of the set of reverse osmosis pressure vessels, the second pressure vessel coupled directly or indirectly to the first pressure vessel, and coupling a retentate from the retentate outlet of the second pressure vessel to a feed tank coupled to the feed inlet of the first pressure vessel when the alcohol percentage is within a first target range of 0.5 to 18% alcohol-by-volume (ABV) and/or when the real extract percentage is within a second target range of 1% to 50%, preferably 1% to 25%.

In accordance with another embodiment of the invention, a water removal system for reducing beverage loss during loading or unloading of a beverage into or from the water removal system includes a set of reverse osmosis pressure vessels, each pressure vessel having a feed inlet, a retentate outlet, and a permeate outlet, the pressure vessels coupled so that each successive pressure vessel has its feed inlet coupled to the retentate outlet of its preceding pressure vessel, a fluid line configured to be coupled to the feed inlet of a first pressure vessel of the set of reverse osmosis pressure vessels and configured to permit deaerated water into the first pressure vessel, a feed tank configured to be coupled to the feed inlet of the first pressure vessel of the set of reverse osmosis pressure vessels and configured to be coupled to or decoupled from the retentate outlet of a second pressure vessel of the set of reverse osmosis pressure vessels, the second pressure vessel coupled directly or indirectly to the first pressure vessel, one or more sensors configured to detect an alcohol percentage and/or a real extract percentage at the retentate outlet of the second pressure vessel, and a controller in communication with the one or more sensors and the feed tank, wherein the controller is configured (a) to allow the retentate outlet of the second pressure vessel to be coupled to the feed tank when the one or more sensors detect that the alcohol percentage and/or the real extract percentage is within a first target range and (b) to allow the retentate outlet of the second pressure vessel to be decoupled from the feed tank and coupled to a drain when the one or more sensors detect that the alcohol percentage and/or the real extract percentage is within a second target range, the second target range different from the first target range.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" has at least one member.

The term "manifold" as used in herein is a coupling between a flow line and a plurality of upstream or downstream flow paths, wherein for example, the plurality of flow paths may be associated with outlets of pressure vessels.

"Beverage" as used herein refers to any alcoholic beverage, including beer, wine, and cider, to any solution having alcohol (for example, an ethanol solution), and to any beverage made from fermented products, including beer, wine, cider, mead, and kombucha.

"Real Extract", expressed as a percent weight, is defined as the mass of non-ethanol and non-water compounds within a liquid or beverage.

Disclosed herein are multi-pass, multi-stage reverse osmosis systems for the concentration of beverages, including alcoholic beverages, that allow for easy and stable flow control and avoid the need for buffer tanks or flow pacing between passes, such as the first pass and the second pass. Systems described include multi-stage reverse osmosis systems that operate at low temperatures and high pressures, which are capable of reaching high beverage concentrations and are easily cleanable. Embodiments below describe concentration systems, e.g., ethanol concentration systems, but may also be used in water removal systems that monitor and control the alcohol percentage and/or real extract percentage of a beverage.

Flow Control

Figure 1:
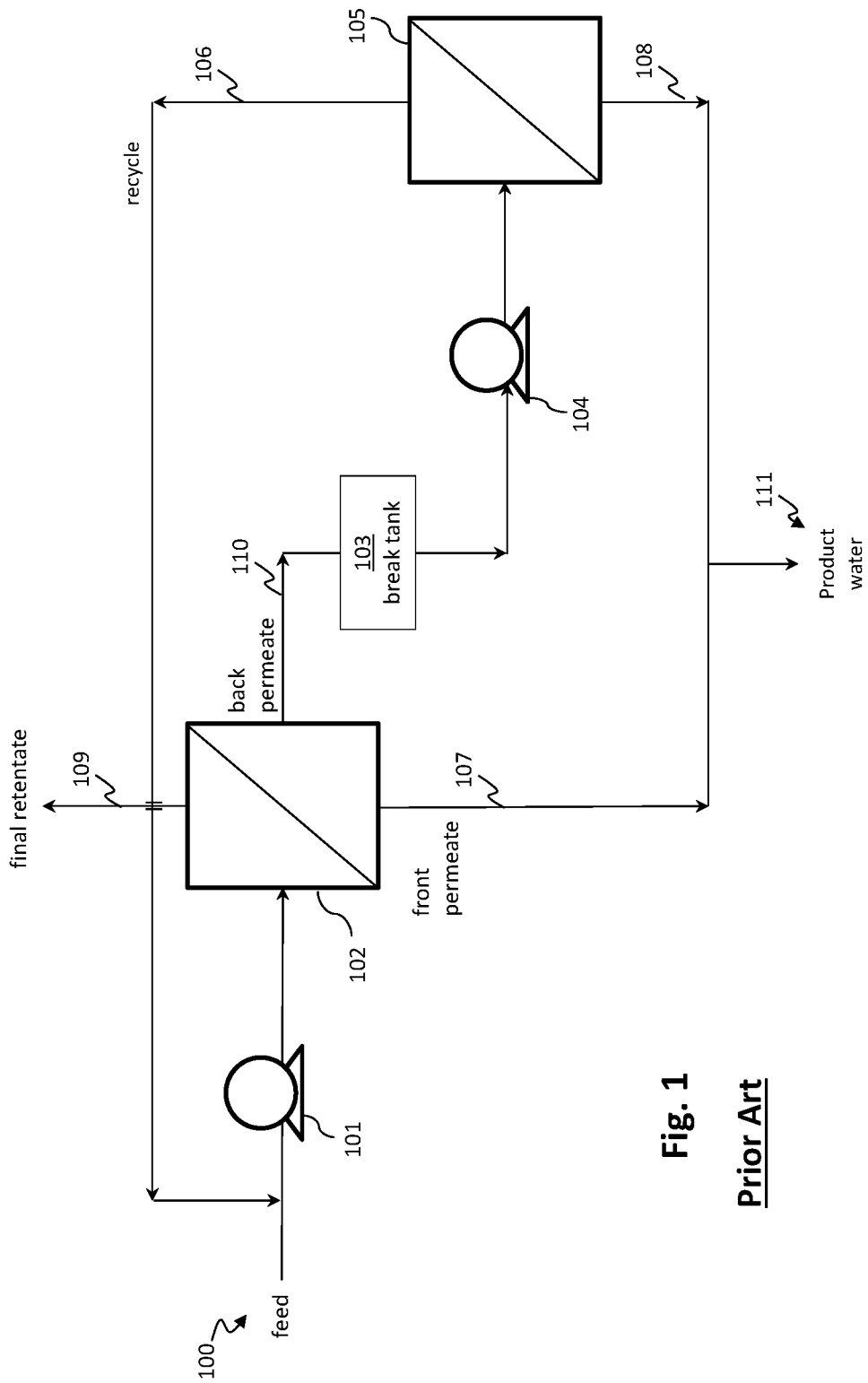
FIG. 1 is a diagram of a conventional split partial second pass reverse osmosis system according to the prior art.

FIG. 1 is a diagram of a conventional split partial second pass reverse osmosis system. A liquid feed 100 including a solvent and a solute is directed to a high pressure pump 101, where it is pressurized and directed to a first reverse osmosis unit 102. This unit 102 typically includes one or more pressure vessels, each pressure vessel containing one or more membrane elements. The pressure vessel is configured such that feed 100 enters one end of the pressure vessel 102 so as to produce at another end a retentate 109, which is enriched in the solute. The elements within the pressure vessel 102 are fluidly coupled. Permeate may be withdrawn from either end, or both ends, of the pressure vessel 102. In a split partial second pass configuration, a permeate plug is often introduced between two elements in the pressure vessel 102 so that the permeate is split. The permeate exiting nearest the feed inlet (the front permeate 107) is often lower in solute concentration than the permeate exiting nearest the retentate outlet (back permeate 110).

In a typical split partial second pass implementation, the back permeate 110 is directed to a break tank 103, and then to a second pump 104 before being fed to a second reverse osmosis unit 105. The purpose of the break tank 103 is to provide a buffer if the flow rates of the back permeate and the second pump are not perfectly matched. An alternate approach is to flow pace the second pump 104 with the flow rate of the back permeate 110 and eliminate the use of the break tank 103. In this case, special care is needed to ensure the stability of the inlet pressure to the second pump 104. If the pressure at the inlet of the second pump 104 drops by too much, it could risk cavitation damage to the pump. Conversely, if the pressure at the inlet to the second pump 104 rises too much, there may be damage to the inlet seals of the second pump. The pump 104 feeds the back permeate 110 to a second reverse osmosis unit 105. Retentate 106 from the second reverse osmosis unit 105 is recycled to the feed 100, while the front permeate 107 from the first unit 102 is blended with permeate 108 from the second reverse osmosis unit 105 to create product water 111.

Figure 2:
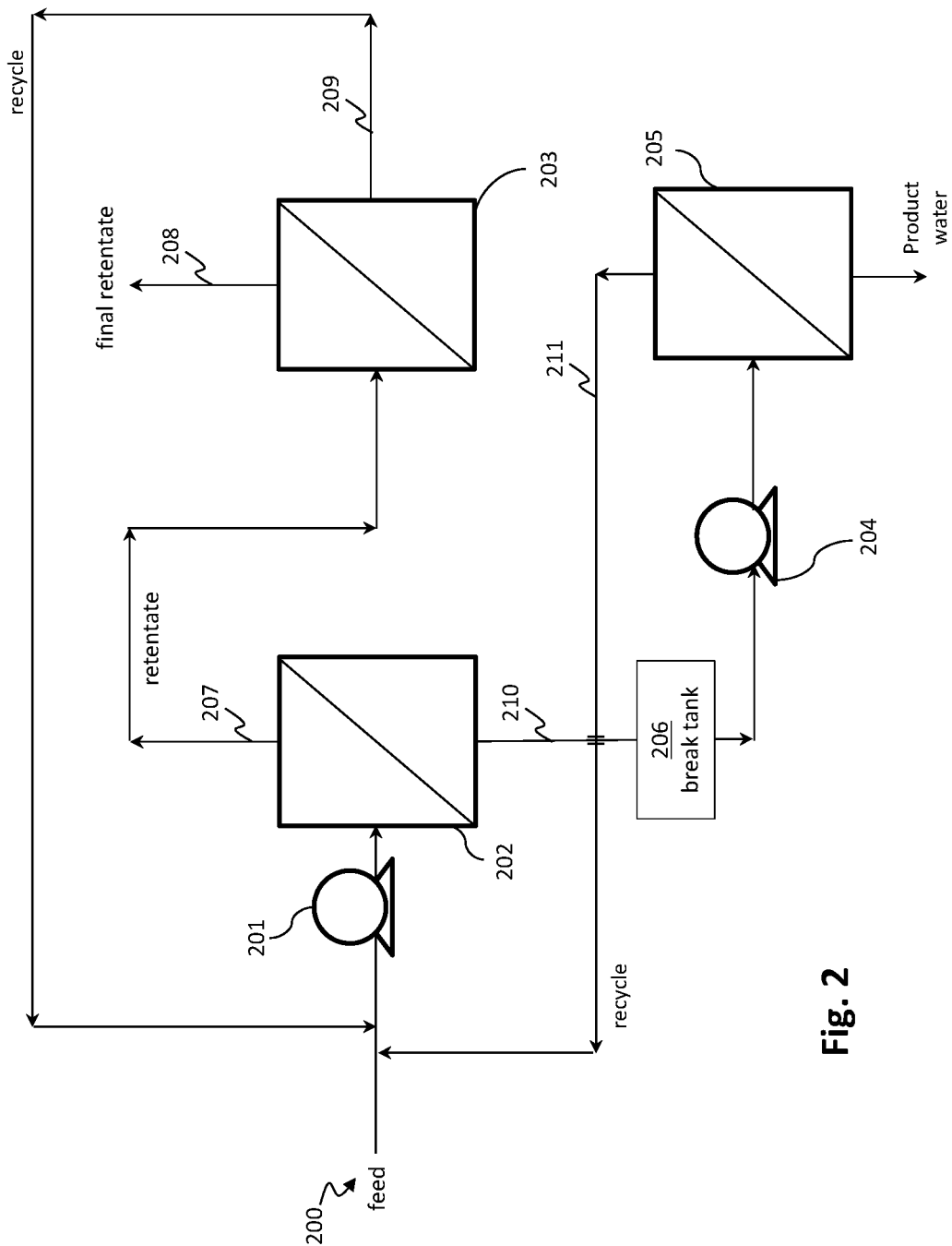
FIG. 2 is a diagram of a two-stage reverse osmosis system with a partial second pass, in accordance with an embodiment of the invention.

FIG. 2 is a diagram of a two-stage reverse osmosis system with a partial second pass configured to remove water from alcoholic beverages in accordance with an embodiment of the present invention. Feed 200 is pressurized by a high pressure pump 201 and directed to a first reverse osmosis unit 202. The feed, in this case typically contains between 0% and 25% ethanol by weight. In order to remove a significant portion of water from the beverage, it may be desirable to employ two or more stages (for example, 202 and 203) of reverse osmosis in the first pass. One or more of these stages may be operated at pressures of between 1,500 psi and 2,000 psi. Retentate 207 from the first reverse osmosis unit 202 is directed to a second reverse osmosis unit 203, which produces a final retentate 208 as well as a permeate 209 that is recycled back to mix with the feed 200. Since ethanol molecules are small and difficult to reject with reverse osmosis membranes, it may be desirable to direct permeate 210 from the first-pass, first-stage unit 202 to a second pass of reverse osmosis 205. Between units 202 and 205, a buffer tank (or flow pacing) and pump 204 can be used. The retentate 211 from the third reverse osmosis unit 205 is recycled back to mix with the feed 200.

In some embodiments, because the ethanol concentration of the permeate 209 from the second stage 203 is likely to be in a similar range to that of the liquid feed 200, it may be advantageous to recirculate the second stage permeate 209 back to the feed 200, rather than directing it to a fourth unit. Challenges with the approach related to FIG. 2 include:

Maintaining an oxygen-free and sanitary break tank. Oxygen seriously degrades the quality of beverages such as beer and wine. If a break tank is configured to be part of the reverse osmosis system, it therefore needs to be oxygen free, as well as sanitary. These requirements can increase cost and complexity of the overall system.

Careful permeate pacing. If one is to match the flow rate of the second pump 204 with the flow of the permeate 210 from the first reverse osmosis unit 202, one must pay particular attention that the inlet pressure to the pump 204 does not fluctuate too low or too high and cause cavitation damage or damage to the inlet seals of the pump 204.

Inflexibility. The system of FIG. 2 does not enable easy adjustment of the relative flow 210 to the second pass 205 versus the relative flow 209 that is directly recycled from the second reverse osmosis unit 203 to the feed 200.

Figure 3:
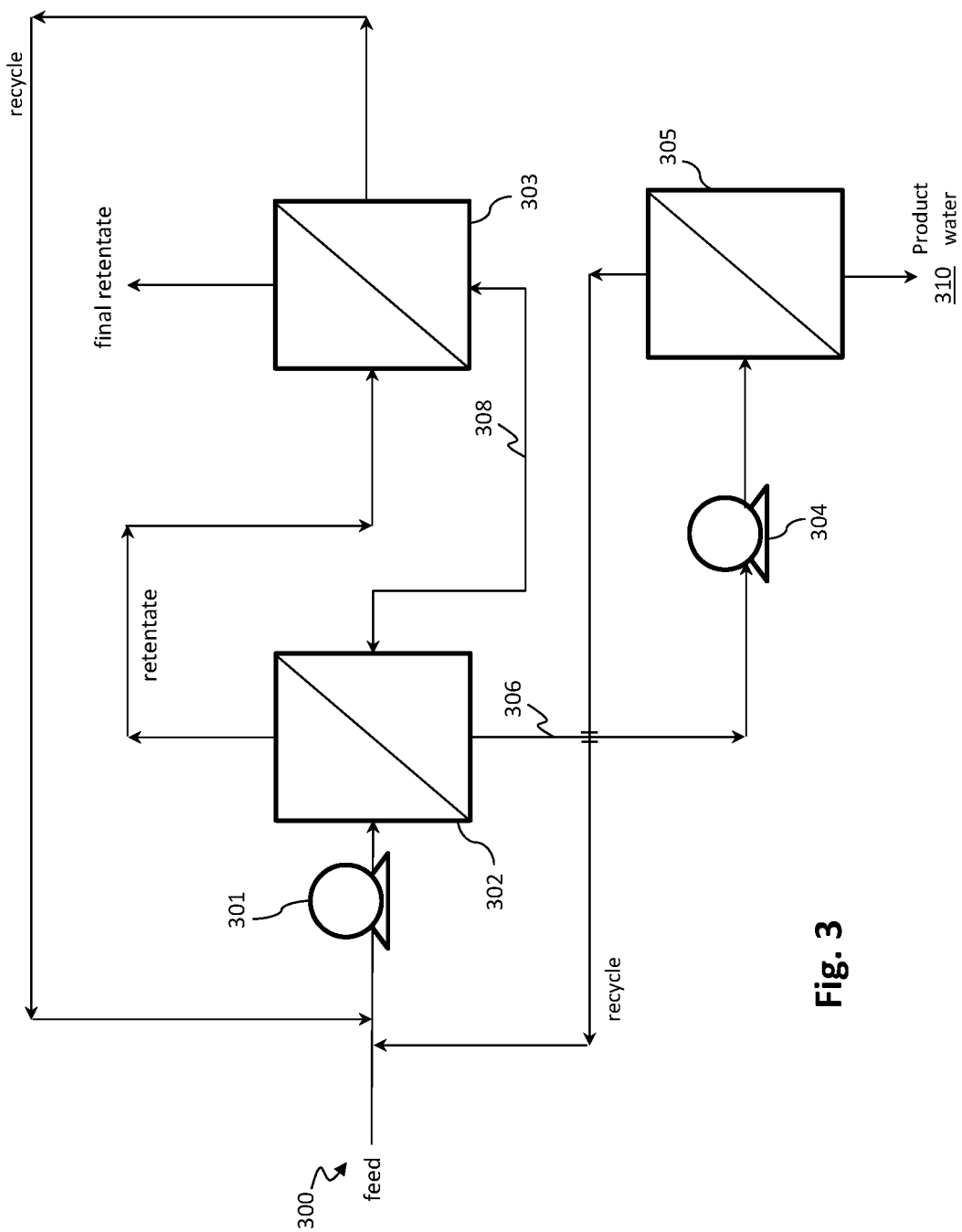
FIG. 3 is a diagram of a two-stage reverse osmosis system, including a fluid coupling between permeate outlets from the first reverse osmosis and the second reverse osmosis unit, in accordance with another embodiment of the invention.

FIG. 3 is a diagram of a two-stage reverse osmosis system, in accordance with another embodiment of the present invention, similar in some ways to that illustrated in FIG. 2, but including a fluid connection 308 between permeate outlets of the first reverse osmosis unit 302 and the second reverse osmosis unit 303. This connection 308 stabilizes the feed pressure to the second pump 304 and also allows (unlike a direct recycle to the feed 300), adjustment of the recycling flow to the feed 300 from the second pass reverse osmosis unit 305 by adjusting flow through the second pump 304.

FIG. 3 illustrates a significant modification to the system of FIG. 2, the modification allowing for more stable and flexible flow control. Specifically, the permeate core tubes of two or more reverse osmosis units in the first pass (which includes units 302 and 303) are fluidly coupled in series with one another. For example, the back permeate outlet of the first unit is coupled to the front permeate outlet of the second unit 303. At the same time, another permeate outlet of at least one unit (here, unit 302) involved in this coupling is fluidly coupled to the second pass pump 304 and another permeate outlet of at least one other unit (here, unit 303) involved in the coupling is fluidly coupled to the feed 300. In some embodiments, a permeate plug can be used to stop permeate flow from an end of one or more pressure vessels of a reverse osmosis unit. This design improvement has the following two important effects:

1. Stability. The permeates in connection 308 are fluidly coupled to the feed stream 300, and, therefore, are very close in pressure to the feed stream 300. The feed to the second pump 304 is also in fluid communication with these coupled permeates in connection 308 and, therefore, is also close in pressure to the feed pressure. In other words, this arrangement allows the second pass pump pressure to be anchored to the feed pressure to the high pressure pump 301. This configuration is more stable, provided the total permeate flow from 301 and 303 does not fall below the set-point for the flow rate of the second pump 304.

2. Flexibility. By controlling the flow rate of the second pass pump 304, one can control the percentage of the first pass permeate 306 going to a second pass 305 versus the percentage being recirculated directly to the feed 300.

Particularly advantageous, for high pressure applications such as the removal of water from alcoholic beverages, is the use of a high pressure positive displacement pumps for at least one of pump 304 and pump 301. In this case, the flow to the feed inlet of reverse osmosis unit 302 is set by pump 301. By adjusting a throttle valve placed on the final retentate stream from unit 303, one can control the total permeate flow rate from unit 302 and unit 303. The portion of permeate in line 306 directed to the second pass unit 305 is controlled using a variable frequency drive (VFD) powering pump 304. Finally, the amount of product water 310 produced from reverse osmosis unit 305 can be set by adjusting a retentate throttle valve placed on the retentate outlet of unit 305, since when the retentate throttle valve is closed, there is no retentate recycle flow to the feed 300 and so the product water flow at 310 is at a maximum, and, when the retentate throttle valve is wide open, the product water flow at 310 is at a minimum.

Series-Coupled Elements

In one embodiment, the above-described approach of FIG. 3 can be expanded by connecting front and back permeate ports of a set of reverse osmosis pressure vessels in one long snake-shaped configuration, wherein a front permeate port in a successive unit is fed by a back permeate port of a preceding unit, and in which a tail end of the snake is coupled to recycle permeate to the feed 300 and the head end of the snake is coupled to the second pass unit 305. Additionally each of the reverse osmosis filtration units 302 and 303, for example, can be implemented as a set of series-coupled reverse osmosis pressure vessels. If the pressure drop encountered in this approach through the permeate line is too great, one can instead place a permeate plug in one end of each pressure vessel and couple together the other permeate outlet of the pressure vessels in a manifold. Similarly, the feed inlet of a successive unit can be coupled to the retentate outlet of a predecessor unit.

Figure 4:
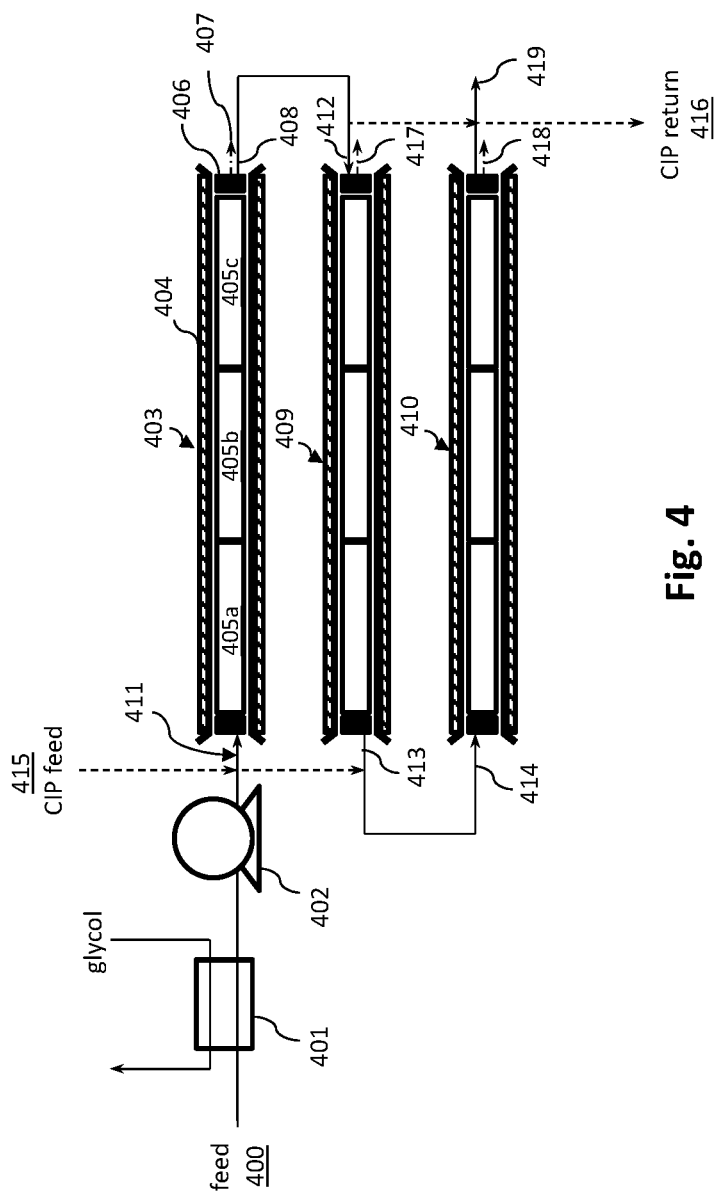
FIG. 4 is a diagram of a reverse osmosis system having series-connected filtration units, in accordance with another embodiment of the invention.

FIG. 4 is a diagram of such an expanded reverse osmosis system having series-coupled reverse osmosis pressure vessels in accordance with a further embodiment of the present invention. In this embodiment, a liquid feed 400 is cooled in a heat exchanger 401 (in this example, using a glycol as a coolant) and directed to a high pressure pump 402. In some embodiments, an additional pump can pre-pressurize the liquid feed 400 before the heat exchanger 401. The pump 402 pressurizes fluid at the feed inlet 411 of a first pressure vessel 403. The pressure vessel 403 contains a set of reverse osmosis membranes 405a, 405b, and 405c and is insulated to prevent heat loss with an insulating layer 404. The pressure vessel 403 includes end caps or plates 406, a permeate outlet 407 and a retentate outlet 408. Fluid exiting the retentate outlet 408 is higher in ethanol concentration than fluid entering the feed inlet 411. Three pressure vessels 403, 409, and 410 are fluidly coupled such that the retentate outlet of one pressure vessel is connected to the feed inlet of the next pressure vessel. For example, the retentate outlet 408 is coupled to feed inlet 412 of pressure vessel 409 and the retentate outlet 413 of pressure vessel 409 is coupled to feed inlet 414 of pressure vessel 410.

Owing to the long fluid path, in the embodiment of FIG. 4, between the feed 400 and the final retentate outlet, in some embodiments, clean-in-place (CIP) lines are coupled to the ends of the pressure vessels to provide a shorter path length for the purpose of cleaning the pressure vessels after filtration of the subject liquid feed. Specifically, the CIP feed lines feed clean water to the pressure vessels in parallel and the CIP return lines collect the used water in parallel. In this example, a clean-in-place (CIP) feed line 415 is fluidly coupled to one end of the pressure vessels 403 and 409 (and the coupling between retentate outlet 413 and feed inlet 414 enables the clean water to enter pressure vessel 410), and a CIP return line 416 is fluidly coupled to the other end of the pressure vessels 409 and 410 (wherein the coupling between retentate outlet 408 and feed inlet 412 enables the cleaning water from pressure vessel 403 to enter the CIP return line 416), allowing for the cleaning of multiple pressure vessels in parallel.

With reference to FIG. 4, in certain embodiments, the feed 400 may be a beverage or a precursor to an alcoholic beverage. For example, the feed 400 may be a beer, a high gravity beer, a cider, a wine, or a juice. The system of FIG. 4 is best employed with solutions containing between 1% and 40% ethanol by weight, and more typically solutions containing between 4% and 20% ethanol by weight. The system described is designed to beneficially allow the ethanol content of the feed 400 to be enriched to between 15% and 50% alcohol by weight, and more typically, to between 20% and 30% alcohol by weight. The embodiments described also beneficially improve long-term performance of the reverse osmosis membranes by facilitating an effective cleaning procedure (the CIP procedure described above) and minimizing axial compaction of the membrane elements.

In FIG. 4, the feed 400 enters a heat exchanger 401, so as to cool the liquid feed 400. By the time the feed 400 reaches the high-pressure pump 402, positioned after any heat exchangers 401, its temperature is between −5 degrees Celsius and 10 degrees Celsius or, more preferably, between the freezing point of the feed 400 and 3 degrees Celsius. This temperature specification is important in maximizing the rejection of ethanol by the reverse osmosis membranes. Typically, the heat exchanger 401 may have a coolant, e.g., glycol, flowing through it, entering at a temperature of between −5° C. and 2° C. To save on energy, it can be beneficial to have an additional heat exchanger that passes permeate from the overall system of FIG. 4 and recycles it to provide cooling to the feed stream 400 before the high pressure pump 402. The inclusion of a heat exchanger is important unless the beverage is stored at close to 0° C. In the event of a rise in temperature between the feed storage tank (not shown) and the high pressure pump 402 (due to heat generation in feed pumps or heat gain from the environment), additional cooling can be provided so as to maximize the ethanol rejection by the reverse osmosis membranes.

In the exemplary system of FIG. 4, the pressure in the one or more reverse osmosis membranes of the pressure vessels is typically between −7 psi gauge and 60 psi gauge. Ideally, if the feed 400 is carbonated, the pressure at the high-pressure pump inlet is no less than 10 psi gauge. The exemplary high-pressure pump 402 is typically a positive displacement pump, such as a piston pump with 316L stainless steel parts so as to provide improved corrosion resistance and cleanliness. The pump 402 should be rated for operation at an outlet pressure of at least 85 bar, and, preferably, at least 125 bar.

After the high-pressure pump 402, the feed enters a series of pressure vessels 403, 409, and 410. The pressure vessels are connected in series such that the retentate outlet port of one pressure vessel is connected to the feed inlet port of the next pressure vessel. The setup is such that flow path reverses direction ("zig-zags") at each connection between pressure vessels (for example, through pressure vessel 403 left to right) and then through the next pressure vessel in a parallel but opposite direction (for example, through pressure vessel 409 right to left). The pressure vessels can include between one and eight, or more preferably, three or four spiral wound elements 405a-405c, and each element is between 37 inches and 43 inches long. The elements may, for example, be four-inch diameter elements, or the elements may be eight-inch diameter elements. In reverse osmosis, it is beneficial to have more elements per pressure vessel, resulting in a reduction of the unit costs of the pressure vessels. In some embodiments, six to eight elements per pressure vessel are employed. However, in this case there are two good reasons for having fewer elements per pressure vessel: (1) with three or four elements per pressure vessel, the whole system can fit inside a standard twenty foot container, for example, for shipping; and (2) with fewer elements per pressure vessel, there is less axial pressure loading on the elements, which increases element longevity (and reduces telescoping). This is particularly important when dealing with viscous solutions, which is the case with concentrated alcoholic beverages such as beer.

It is common to have two to four pressure vessels in series to achieve a process with higher recovery. By contrast, in the exemplary embodiment, it is better to have between five and twenty-five pressure vessels in series or, more preferably, between ten and twenty pressure vessels in series. Because the exemplary reverse osmosis system operates at low temperatures and often with fluids of high osmotic pressure, the permeate flow per element is quite low. To achieve a continuous process with such conditions, it becomes advantageous to have many elements (and consequently, a high number of pressure vessels) in series. Similar design principles disclosed here are also useful in designing continuous reverse osmosis dealcoholization systems and beer clarification systems (i.e. reverse osmosis systems employed for removing color and or flavor from beer or other beverages).

To be more cost-effective, the pressure vessels themselves may be fiberglass reinforced pressure vessels (FRPs), rated for operation at just under 120 bar. The FRPs may be designed to meet ASME pressure vessel codes. In an exemplary embodiment, the system can include a pressure relief valve on a retentate outlet of one of the pressure vessels that releases at above 120 bar. In an exemplary embodiment, the inner surface has a roughness RMA value of less than 1.8 microns to improve its cleanability.

In some embodiments, to keep the fluid cold during processing, it is beneficial to insulate the pressure vessels, for example, with neoprene 404 having a thickness of between 0.5 cm and 3 cm. The neoprene sleeves of such thicknesses can be configured to easily slide over the pressure vessel 403, 409, or 410 during system assembly. To avoid moisture ingress, a barrier layer may be applied to the insulation and/or the edges of the neoprene sleeves may be sealed onto the pressure vessel with tape, paint or another impermeable sealant.

In some embodiments, both ends of the pressure vessels have end caps 406 with permeate and feed/retentate ports. In another embodiment, the ends of the pressure vessel are sealed with large tri-clamp fittings, end-plates, or flanges. In another embodiment, the feed/retentate and permeate ports can be side ports to the pressure vessel (i.e., not through the ends of the pressure vessels) to free the ends of the pressure vessel for the changing of membranes through the end caps/plates and to allow gases to more easily be bled out of the pressure vessel from a side port located towards the upper side of the pressure vessel.

In some embodiments, for draining and purging of the reverse osmosis filtration system, carbon dioxide or nitrogen gas connections are installed at a high point in the system so that liquid may be pushed through the system to drain or recovered into a feed or product tank.

Figure 5:
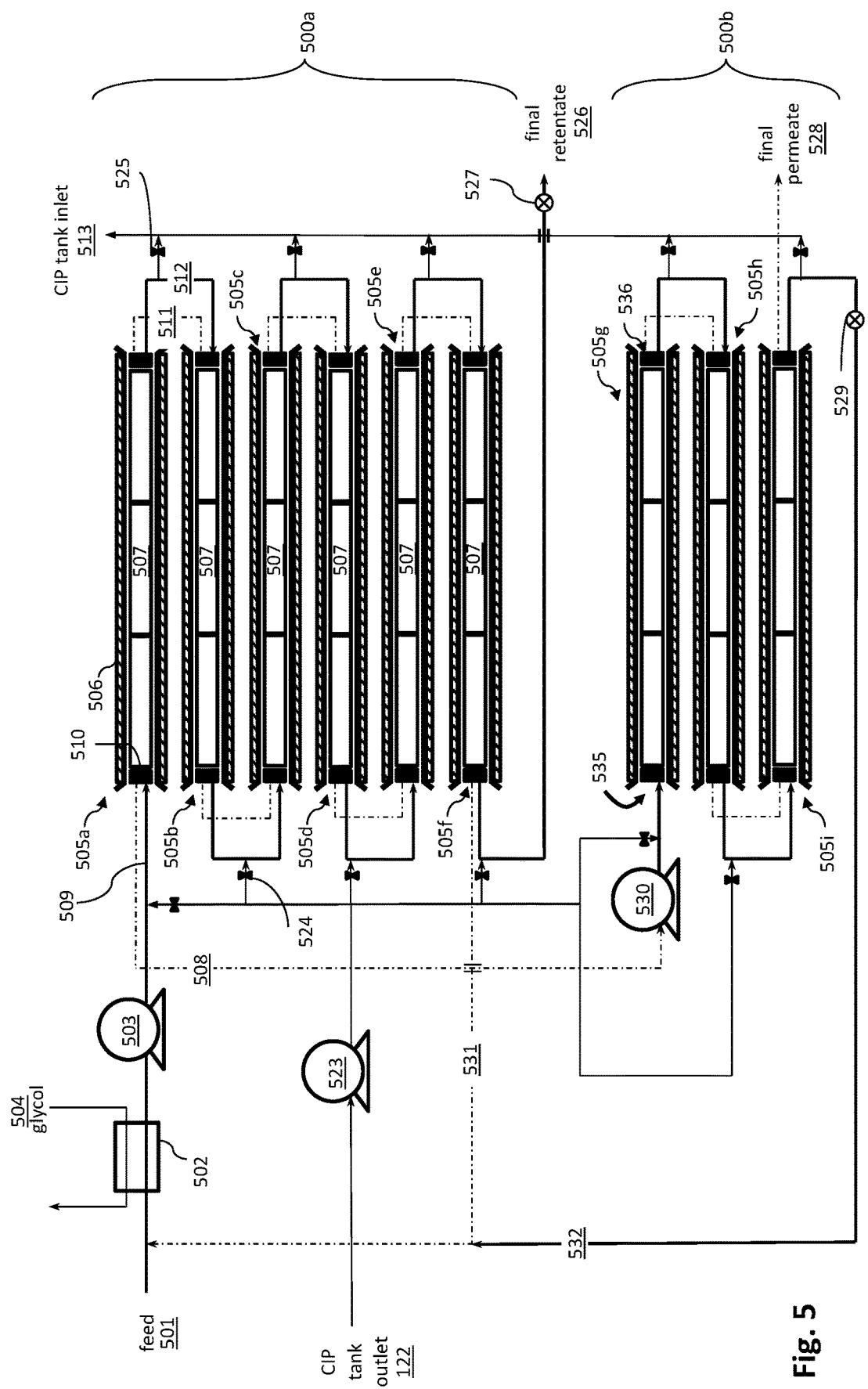
FIG. 5 is a diagram of a reverse osmosis system having series-connected filtration units in multiple passes, in accordance with another embodiment of the invention.

The cleaning of the reverse osmosis system can be slow and/or inefficient if cleaning liquids are pushed through the many pressure vessels and membranes in series. To mitigate this issue, a CIP manifold can be configured to feed some or all pressure vessels in parallel, as illustrated in FIGS. 4-5. This CIP manifold can be isolated during filtration operations by using high pressure valves to selectively couple to the pressure vessels. This selective coupling may be automated. In some embodiments, to achieve increased flow rates specific to cleaning, the CIP feed line(s) can be coupled to a separate pump that has a rated throughput of between five and twenty times the high-pressure pump 402. The separate pump operates at a much lower pressure than the high-pressure pump 402. An exemplary separate pump is rated for providing a pressure head of between 15 psi and 100 psi, or more preferably, between 30 psi and 60 psi. Moreover, the CIP feed line(s) can be between 50% and 200% larger in pipe diameter (to accommodate a greater flow rate at a lower pressure) than the lines containing the liquid feed 400 from the high-pressure pump 402 to the first pressure vessel 403.

In some embodiments, the permeate outlets 408, 417, 418 from the pressure vessels may be manifolded together in series or in parallel. Some permeate outlets may feed a second pass of reverse osmosis filtration and some permeate from these outlets may be recirculated to the liquid feed 400. In some embodiments, back-flow preventors can be installed on the permeate lines to avoid the risk of damaging the membranes. Back-flow preventors can take the form of cylinders having spring-loaded valves. When there is negative pressure in the system, the valve shuts and prevents a reverse flow of permeate through the membrane, causing delamination of the membrane. Note that the system of FIG. 4 is above atmospheric pressure. If any feed or concentrate lines were opened to ambient pressure, that would result in a reverse surge of permeate, which could permanently damage the reverse osmosis membranes. Thus, the back-flow preventors can avert this issue.

FIG. 5 is a diagram of a reverse osmosis filtration system having series-coupled pressure vessels in accordance with a further embodiment of the present invention. Feed solution 501 enters a heat exchanger 502 that is cooled with a coolant 504, e.g., glycol. The feed solution 501 is then pressurized by a high-pressure pump 503. The low temperature pressurized feed 509 then enters a first pressure vessel 505a of multiple pressure vessels 505x (x=a, b, f). Each pressure vessel 505x contains multiple spiral wound membrane elements 507. Each pressure vessel 505x has an end cap 510 at either end, each end cap having a retentate port and a permeate port. Retentate exits the first pressure vessel and is coupled through line 512 to the inlet of second pressure vessel 505b. As shown by FIG. 4, the retentate stream then snakes through the remaining first-pass 500x (where x=c, d, f) pressure vessels on the retentate side of the membranes before reaching throttle valve 527 to yield the final retentate 526.

Also as shown by FIG. 4, a similar snake is employed with respect to the permeate side of the reverse osmosis filters. For clarity of illustration, the permeate conduits are presented in a dot-dashed line, and are a part of the embodiment described. The front permeate outlet of the first pressure vessel 505a is coupled via conduit 508 to the feed inlet of a second high pressure pump 530, which feeds a second stage of series coupled pressure vessels 505y (where y=g, h, i). Optionally, a heat exchanger can be implemented before pump 530 in order to reduce temperature and improve ethanol rejection in the second pass pressure vessels 5505y. The "snaking" method disclosed herein is advantageous for the reasons articulated in connection with FIG. 3, for example, with regard to the stability and flexibility of the system.

The back permeate port of the first pressure vessel 505a is coupled via conduit 511 to the front permeate port of the second pressure vessel 505b. The back permeate port of the second pressure vessel 505b is coupled to the front permeate port of the third pressure vessel 505c, and so on, until the back permeate port on the sixth pressure vessel 505f is coupled via conduit 531 to recycle a portion of the permeate back to the feed 501.

As previously mentioned, fluid in conduit 508 is pressurized by high-pressure pump 530 and directed to the inlet of a first pressure vessel 505g in the second stage. This fluid on the retentate side of 505g flows, in series (with conduits for this purpose shown in solid), from a retentate outlet to through a conduit to an inlet of pressure vessel 505h, and from the retentate outlet of 505h to the inlet of pressure vessel 505i, and finally from the retentate outlet of 505i to reach throttle valve 529 in series with conduit 532 for recycling fluid to the feed 501. In the second stage, the permeate flow is similarly in series (with conduits for this purpose shown in dot-dashed lines). The front permeate outlet 535 on pressure vessel 505g is capped to prevent permeate flow from the end. The back permeate outlet 536 of pressure vessel 505g is coupled to the front permeate outlet of a pressure vessel 505h. The back permeate outlet of pressure vessel 505h is coupled to the front permeate outlet of pressure vessel 505i. The back permeate port of pressure vessel 535i provides the final permeate 528.

As described in connection with FIG. 4, the system of FIG. 5 is similarly equipped with a cleaning in place (CIP) arrangement. A cleaning or rinsing tank outlet 522 is fluidly coupled to a cleaning pump 523. The cleaning pump 523 feeds cleaning water to pressure vessels 505a-505i in parallel in a manner analogous to the CIP arrangement of FIG. 4. In some embodiments, because the permeate side of the reverse osmosis filters is predominately subjected to the solvent (such as water), the cleaning fluid is fed on the retentate side of the pressure vessels, by entering on the left side (regardless whether entering an inlet or a retentate port, and exiting on the right side (again regardless whether from an inlet or a retentate port) of each pressure vessel. After passing from left to right through the pressure vessels, the cleaning water is returned over a line to the CIP tank inlet 513.

The parallel connections may be blocked by closing high pressure valves 524 and 525. (For clarity of illustration, only the first valve 524 on the left and the first valve 525 on the right is called out, but similar valves below each such enumerated valve are encompassed by these references.) When such valves are opened, the system may be flushed with cleaning fluid in parallel. When the valves are closed, the filtration system can operate in series described above. In some embodiments, the high pressure valves 524 and 525 are implemented by ball valves.

Figure 6B:
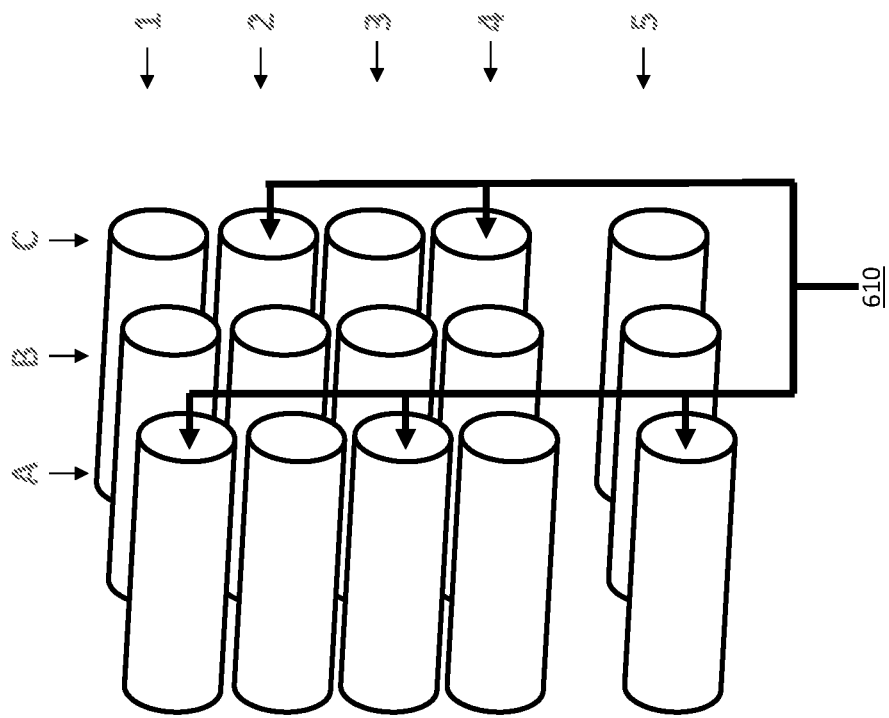
FIGS. 6A-6B are diagrams showing one end of first and second pass of reverse osmosis pressure vessels configured to be used in a system such as those provided in FIGS. 2-5, in accordance with another embodiment of the invention.
Figure 6A:
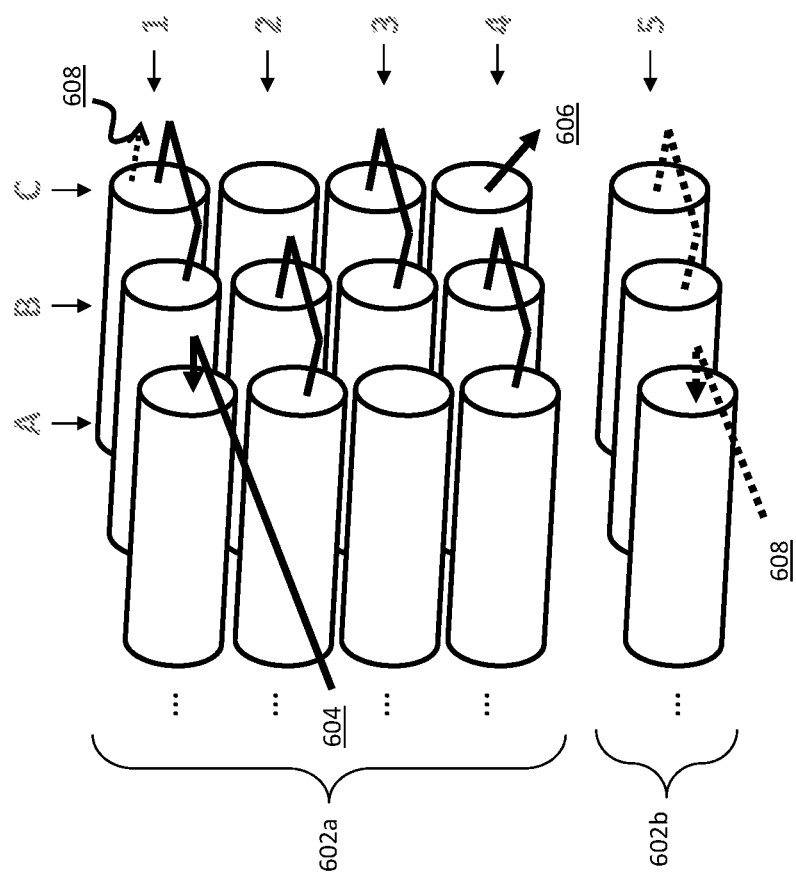

FIGS. 6A-6B show one end of first and second pass of reverse osmosis pressure vessels configured, in accordance with an embodiment of the present invention, to be used in a systems such as those illustrated in FIGS. 2-5. By the use of dark solid lines, FIG. 6A illustrates the inlet/retentate coupling of the pressure vessels in a first pass 602a and second pass 602b. The pressure vessels here are identified by their placement in the grid having columns A through C and rows 1 through 5. The feed 604 is coupled to the inlet of the first pressure vessel A1 and flows to the retentate outlet at the other end (not shown) of pressure vessel A1. The retentate outlet at the other end of pressure vessel A1 then is coupled to the inlet of pressure vessel B1, and the retentate outlet of pressure vessel B1 is coupled as shown to the inlet of C1. The retentate outlet of C1 is coupled to the inlet of A2, and then a similar flow pattern occurs through the pressure vessels in the second row. Thus the inlet/retentate flow snakes or winds its way through the first four rows of the pressure vessel system and outputs retentate 606. In the last row 602b, the feed 608 is the permeate from pressure vessel A3. This permeate 608 is fed through these pressure vessels A5, B5, and C5. Note that, in some embodiments, permeate ports of pressure vessels in some rows can be coupled or manifolded in parallel instead of series. For example, pressure vessels A1, B1, and C1 can be manifolded in parallel while pressure vessels A2, B2, and B3 are coupled in series. Further, pressure vessels A3, B3, and C3 can be coupled in series while pressure vessels A4, B4, and B4 are manifolded in parallel. This is because manifolding in parallel reduces pressure drop compared to manifolding in series. A complete snake-through of all of the pressure vessels is only required if one desires full flexibility as to the fraction of flow to be directed through the head of the snake (for example, one or more pressure vessels of the first row A1, B1, C1) versus the tail of the snake (for example, one or more pressure vessels of the fourth row A4, B4, C4), i.e., 0-100% of the flow. Often, partial flexibility is sufficient. For example, one may only need the flow through the head of the permeate snake to be between 25% and 75% of the snake. Such flexibility can be achieved by having permeate ports of pressure vessels in the middle of the snake be manifolded in series. Permeate ports towards either end of the snake may also be manifolded in parallel.

FIG. 6B illustrates the cleaning manifold 610 that is connected in parallel to each row of pressure vessels. Thus, the left side of cleaning manifold 610 is coupled to rows 1, 3, and 5 while the right side of the manifold 610 is coupled to rows 2 and 4.

Reducing Loss

The process of loading beverage (such as beer) into a continuous concentration system can result in losses of the beverage, resulting in both waste and cost inefficiency. The process of unloading beverage can lead to a similar burden. Disclosed herein are methods and systems to address this challenge in an exemplary ethanol concentration system. The exemplary ethanol concentration system can be any of the systems described herein (see, for example, FIGS. 2-6). The exemplary ethanol concentration system includes a set of reverse osmosis pressure vessels, each pressure vessel having a feed inlet, a retentate outlet, and a permeate outlet. The pressure vessels are coupled so that the feed inlet of each successive pressure vessel is coupled to the retentate outlet of its preceding pressure vessel. Further, the permeate outlet of each successive pressure vessel is coupled to the permeate outlet of its preceding pressure vessel.

Figure 7:
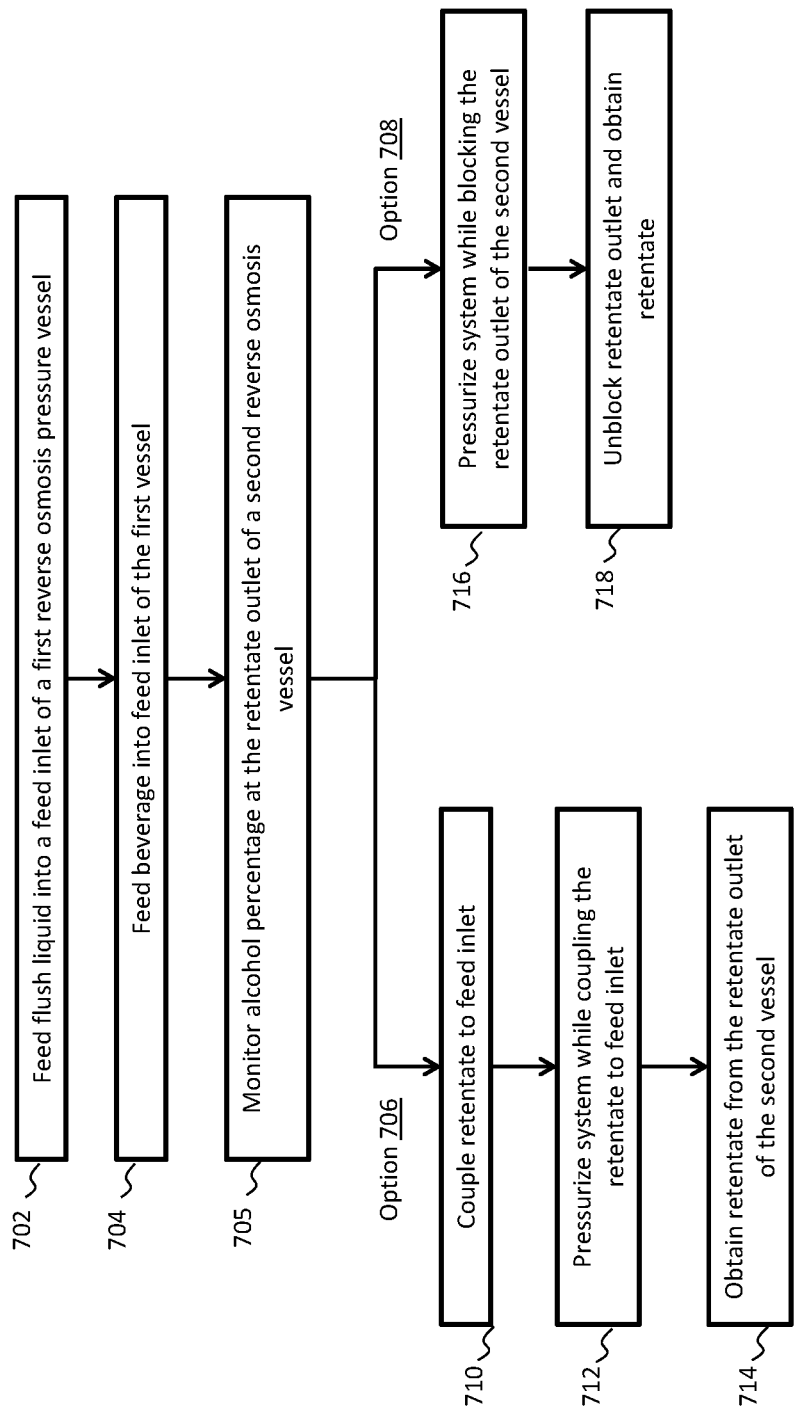
FIG. 7 is a flowchart of an exemplary method of reducing losses during the loading of the beverage into an exemplary ethanol concentration system.

FIG. 7 is a flowchart of an exemplary method of reducing losses during the loading of the beverage into an exemplary ethanol concentration system. In a first process 702, a flush liquid, such as deaerated water, is fed to the feed inlet of a first reverse osmosis pressure vessel of the system. This has the effect of reducing oxygen in the system (e.g., to below, for example, 50 parts per billion). By reducing oxygen, beer flavor is better kept intact. In process 704, the subject beverage (for example, beer) is fed into the feed inlet of the first pressure vessel. In process 705, which can occur during process 704, the retentate outlet of a second reverse osmosis pressure vessel is monitored so that once the retentate reaches a target alcohol percentage (for example, between 0.5-5% ABV), one of two options 706 and 708 are available to reduce loss of the beverage in the system. In some embodiments, the process(es) 702 through 718 can be repeated one or more times to effectively reduce losses. In an exemplary embodiment, the monitoring process 705 can be modified to monitor a total flow through the concentration system rather than monitoring an alcohol percentage for a subsequent round or rounds of the overall process of FIG. 7. Thus, for a subsequent round of process(es) 702 through 718, the total flow can be monitored as an alternative to monitoring the alcohol percentage. Note that the second pressure vessel can be coupled directly to the first pressure vessel such that the retentate outlet of the first pressure vessel is coupled to the feed inlet of the second pressure vessel. In other embodiments, the second pressure vessel can be coupled indirectly such that one or more pressure vessels are coupled in between the first and second pressure vessels.

In process 710 of option 706, the retentate from the retentate outlet is coupled to the feed inlet of the first pressure vessel. The feed inlet may be coupled to a feed tank, and also coupled to the retentate. The flow is from the retentate and from the feed tank, into the feed inlet of the first pressure vessel. During loading, the beverage flows out of the feed tank. During unloading, the beverage flows into the feed tank, at least initially. In some embodiments, this coupling process is done during the feeding of beverage into the feed inlet of the first pressure vessel. In process 712, the concentration system is pressurized while coupling the retentate from retentate outlet of the second pressure vessel to the feed inlet of the first pressure vessel. In some embodiments, the pressurizing process 712 is in a pressure range of 500 psi to 3,000 psi. In a preferred embodiment, the pressurizing 712 is in a pressure range of 1,000 psi to 2,000 psi. In process 714, retentate from the retentate outlet of the second pressure vessel is obtained when the alcohol percentage is in a target range. The target range is 15-25% ABV if the beverage is a beer and 20-30% ABV if the beverage is a wine. In some embodiments, the obtaining process includes directing the retentate to a product tank coupled to the retentate outlet of the second pressure vessel.

In process 716 of option 708, the system is pressurized to within a pressure range of 1500 psi to 3000 psi while blocking a part of the retentate outlet of the second pressure vessel. In some embodiments, the part of the retentate outlet being blocked in process 716 can cause some or all of the retentate to be blocked from exiting the retentate outlet. For instance, the retentate outlet can be substantially blocked so that a trickle of retentate is allowed to exit the outlet. In process 718, the retentate outlet is unblocked and the retentate is obtained. In some embodiments, the retentate is directed to a product tank coupled to the retentate outlet.

Figure 8:
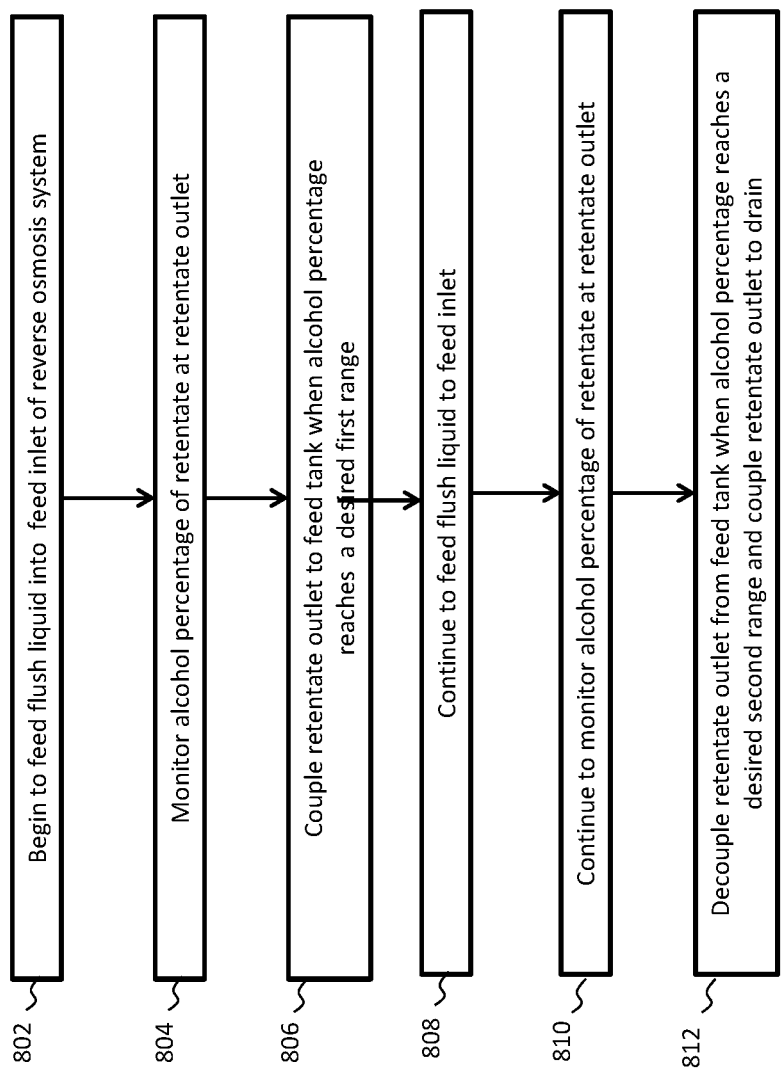
FIG. 8 is a flowchart of an exemplary method of reducing losses during the unloading of the beverage into an exemplary ethanol concentration system.

FIG. 8 is a flowchart of an exemplary method for reducing losses during the unloading of the beverage from the exemplary ethanol concentration system described above. This is typically done after the concentration system has finished concentrating the beverage. In process 802, the system begins to feed a flush liquid, e.g., deaerated water, into the feed inlet of a first pressure vessel of the set of reverse osmosis pressure vessels. In process 804, the alcohol percentage of a retentate outlet of a second pressure vessel of the set of reverse osmosis pressure vessels is monitored. In certain embodiments, pressure vessels are flushed in series through the same retentate flow path as was employed during concentration (i.e., the retentate outlet of the first pressure vessel is coupled to the feed inlet of the second pressure vessel). For spiral wound membrane elements, pressure vessel feed and retentate ports may be used interchangeably. This allows the concentration gradient to be kept somewhat intact when flushed back to the feed tank. Ideally, the concentration gradient would later be re-loaded in series into the system in the reverse direction, bringing the system back to as close as possible a condition on the restart of concentration as when concentration was stopped. Alternatively, the second pressure vessel may be before the first pressure vessel such that the retentate outlet of the second pressure vessel is coupled to the feed inlet of the first pressure vessel, thus allowing for a reverse flush. In other embodiments, the second pressure vessel may be coupled indirectly such that one or more pressure vessels are coupled in between the first and second pressure vessels—also a reverse flush. When the alcohol percentage falls to a target first range (for example, between about 105% ABV of the feed concentration and about 95% ABV of the desired concentrated product ABV), the retentate outlet is decoupled from a product tank and coupled to a feed tank, in process 806, so that the resulting retentate, or a portion thereof, flows to the feed tank. For example, the ethanol concentration may be 22% ABV when the beverage is concentrated and the feed concentration may be about 8% ABV. In this case, the retentate outlet may be coupled to the feed tank when the ethanol concentration drops to between about 20.9% ABV and about 8.4% ABV or lower. In process 808, a flush liquid, such as deaerated water, continues to be fed to the feed inlet of the first pressure vessel such that a portion of the retentate from the retentate outlet continues to be diverted to the feed tank. The portion can be in a range of 50% to 95%. In process 810, the alcohol percentage of the retentate outlet of the second pressure vessel continues to be monitored. The ethanol concentration continues to drop as the flush liquid, e.g., deaerated water, continues to be fed into the feed inlet, and, when the alcohol percentage is within a target second range (for example, between about 10% and about 95% ABV of the feed concentration of the beverage), the retentate outlet is decoupled from the feed tank and coupled to a drain in process 812. For example, for a feed concentration of about 8% ABV, the retentate outlet may be decoupled from the feed tank and coupled to the drain when the ethanol concentration drops to between about 0.8% ABV or lower and about 7.6% ABV.

Although the methods above involve monitoring ethanol levels, other components may be monitored, such as real extract, proteins and/or sugars. In each case, the trigger concentrations for switching between feed tank, product tank and drain are all relative to the feed concentration of the liquid or the desired concentration of the concentrated product. When moving from a reverse osmosis (RO) system filled with a flush liquid (e.g., deaerated water (DAW)) to a system loaded with the feed beverage, the RO system outlet should be switched from drain to feed tank when the outlet concentration is somewhere between about 10% and about 95% of the feed concentration. When concentration begins, the RO system outlet should be switched from feed tank to product tank when the outlet concentration rises to a point between about 105% of feed concentration and about 95% of the desired concentrated product concentration. When concentration is complete and the flush liquid is being introduced into the RO system, the RO system outlet should be switched from product tank to feed tank when the outlet concentration falls to a point between about 105% of feed concentration and about 95% of the desired concentrated product. Then, when the outlet concentration falls to between about 10% and about 95% of the feed concentration, the RO system outlet should be switched to drain.

The monitoring of ethanol and/or other components (e.g., real extract) levels can be done using one or more of the following four sensors: inline sound velocity sensor, inline refractive index sensor, inline near infra-red sensor and/or inline density sensor. Preferably, a thermocouple may also be included to allow for normalization of these measures. Optionally, a near-infrared sensor might be added to allow for the measurement of $CO_2$ and the normalization of other measurements for $CO_2$ content. All sensors and wiring should meet Class I Division 2 or Class I Division 1 standards. Various measures, such as density, sound velocity, refractive index and/or infrared spectrum, may be used as proxies for target ethanol concentrations. For example, the refractive index in combination with the density may serve as a proxy for in-line determination of the ethanol content of a liquid. Other reasonably normalized versions of sound velocity or the near infrared spectrum may similarly serve as proxies for concentration.

Reducing Downtime and Losses Via Membrane Elements with Thin Feed Channels

There is a trade-off involved in determining the number of elements to put in series. The trade-off is between permeate recovery achievable and time taken to load or unload product into/from the system. The more elements in series, the higher the level of permeate recovery achievable for a given feed flow rate—this allows the system to reach higher retentate solute concentrations. However, the more elements in series, the greater the hold-up of the system and the longer it takes to empty, clean, re-fill and restart the concentration process, which translates into higher downtime costs of operating the system. Therefore, it is beneficial to achieve a series-coupled arrangement of reduced hold-up with the same number of elements in series (or, a greater number of elements in series for the same hold-up).

In a series-coupled reverse osmosis (RO) system, a substantial portion of the hold-up is on the feed-side of the membrane elements. Membrane elements are typically composed of a feed spacer of between 28 mil (0.028 inches) and 34 mil (0.034 inches) in thickness that separates membrane leaves. If the spacer can be reduced in thickness, this can significantly reduce the hold-up volume. An additional benefit in reducing the feed channel thickness is that the total membrane area that is rolled into each element may be increased, which can drive up the permeate flow per element. A further benefit is that in having narrower feed channels, the flow is more laminar and there is a narrower mixing front when pushing one product out with a flush liquid (e.g. deaerated water (DAW))—this means that product losses are reduced when loading and unloading a valuable product. There are various ways one might do this.

A first approach is to employ a feed spacer that is between 10 mil (0.010 inches) and 27 mil (0.027 inches) thick. It is difficult to make spacers of high porosity when the thickness is reduced, and spacers that do not have high porosity can block flow through the feed channel, which increases stream-wise pressure drop. Still, there can be a benefit to dropping feed spacer thickness as described.

A second approach is to eliminate the typical feed spacer in favor of a spacer formed on a surface of the membrane leaves that holds the membrane leaves apart from one another, e.g., printed dots, lines or other patterns, such as described in U.S. Pat. No. 7,311,831 and U.S. Pat. Appl. No. 2004/0011723A1, which are incorporated by reference herein in their entirety. Ideally, in such scenarios, when feed liquid is passed through the membrane, the channel height is between 1.5 mil (0.0015 inches) and 20 mil (0.020 inches). The lower channel height can allow significantly more membrane to be packed into an element, and leads to an element with substantially reduced hold-up volume.

These thin feed channel concepts may be of further benefit in food grade applications where cleanability of the membrane is important. Printed flow obstructions (rather than a mesh), especially when combined with sanitary design features, such as those envisioned in PCT Appl. No. PCT/US18/59457 filed on Nov. 6, 2018, may allow for improved shear on the membrane surface and a reduced rate of membrane fouling.

It is worth noting that the above membrane elements with thin feed channel design features are of particular relevance for the processing of valuable and highly fouling liquids where regular rinse or CIP cycles (anything from every four hours to once per week) are required. Every time a rinse or CIP cycle is required there is some product loss involved in switching over from concentration mode to cleaning mode. For beverage applications, where the product is valuable and highly fouling, embodiments of the present invention are highly relevant. For seawater desalination, where the product is low in value and fouling is lower, embodiments of the present invention are less applicable.

Reducing Mixing in Batch Processes Via Membrane Elements with Thin Feed Channels Pure batch processes (as described in U.S. Pat. Appl. Publ. No. 2017/0239620A1) or semi-batch processes (as described in U.S. Pat. Appl. Publ. No. 2010/0270237A1) requiring frequent cleaning suffer in a similar way to continuous processes from downtime and product losses when switching between cleaning and operating cycles—particularly if the characteristic time period for one batch is short. However, batch concentration processes suffer from an additional issue related to mixing between the final retentate from one batch and the fresh feed from the next. At the end of one batch cycle, fresh feed is introduced to the system to push out the retentate from the last batch. Inevitably, there is some mixing between the two, and so either the quantity of retentate received from each batch cycle is reduced or the aggregate solute concentrate in the retentate is reduced. Again, by reducing the hold-up volume and the channel height, it may be possible to reduce the extent of mixing between the two streams. It may also be possible to accomplish the change out in a shorter period of time. Therefore, it may be advantageous to employ membrane elements with reduced feed channel thickness—as described in the paragraphs above—in conjunction with batch or semi-batch reverse osmosis systems.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision not to present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method for reducing beverage loss during loading of beverage into an ethanol concentration system, the ethanol concentration system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:

feeding deaerated water into the feed inlet of a first pressure vessel of the set of reverse osmosis pressure vessels;

feeding the beverage into the feed inlet of the first pressure vessel;

monitoring an alcohol percentage at the retentate outlet of a second pressure vessel of the set of reverse osmosis pressure vessels, the second pressure vessel coupled directly or indirectly to the first pressure vessel; and coupling a retentate from the retentate outlet of the second pressure vessel to a feed tank coupled to the feed inlet of the first pressure vessel when the alcohol percentage is within a first target range of 0.5 to 18% alcohol-by-volume (ABV).

P2. A method according to claim P1, further comprising filtering sediment going into the feed inlet of the first pressure vessel and/or out from the retentate outlet of the second pressure vessel.

P3. A method according to any one of claims P1-P2, wherein the deaerated water is cooled to a temperature of 0° C. to 10° C. before being fed to the feed inlet of the first pressure vessel.

P4. A method according to any one of claims P1-P3, further comprising pressurizing the ethanol concentration system during the coupling process.

P5. A method according to claim P4, wherein the pressurizing is in a pressure range of 500 psi to 3,000 psi.

P6. A method according to claim P4, wherein the pressurizing is in a pressure range of 1,000 psi to 2,000 psi.

P7. A method according to any one of claims P1-P6, further comprising obtaining the retentate from the retentate outlet of the second pressure vessel when the alcohol percentage is in a second target range, the second target range different from the first target range.

P8. A method according to claim P7, wherein the second target range is 15-25% ABV for a beer beverage.

P9. A method according to claim P7, wherein the second target range is 20-30% ABV for a wine beverage.

P10. A method according to any one of claims P7-P9, wherein the obtaining includes directing the retentate to a product tank coupled to the retentate outlet of the second pressure vessel.

P11. A method according to any one of claims P1 to P10, wherein each of the reverse osmosis pressure vessels further includes a filter membrane therein, the filter membrane including membrane leaves separated by a spacer having a thickness of between about 0.0015 to about 0.027 inches.

P12. A method according to claim P11, wherein the spacer is a feed spacer having a thickness of between about 0.010 inches to about 0.027 inches.

P13. A method according to claim P11, wherein the spacer comprises printed dots, lines or patterns formed on a surface of the membrane leaves.

P14. A method according to claim P13, wherein the spacer has a thickness of between about 0.0015 inches to about 0.020 inches.

P15. A method according to any one of claims P1 to P14, wherein monitoring includes using one or more sensors to determine the alcohol percentage and/or a real extract percentage.

P16. A method according to claim P15, wherein the one or more sensors include an inline sound velocity sensor, an inline refractive index sensor, an inline near infrared sensor, and/or an inline density sensor.

P17. A method according to claim P15, wherein monitoring further includes using a thermocouple.

P18. A method according to any one of claims P1 to P17, wherein the ethanol concentration system includes removal of water from the beverage.

P19. A method for reducing beverage loss during loading of beverage into an ethanol concentration system, the ethanol concentration system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:
feeding deaerated water into the feed inlet of a first pressure vessel of the set of reverse osmosis pressure vessels;
feeding the beverage into the feed inlet of the first pressure vessel;
monitoring an alcohol percentage at the retentate outlet of a second pressure vessel of the set of reverse osmosis pressure vessels, the second pressure vessel coupled directly or indirectly to the first pressure vessel; and
blocking at least a portion of the retentate outlet of the second pressure vessel, causing an increase of ethanol in the ethanol concentration system, when the alcohol percentage is within a first target range of 0.5 to 18% alcohol-by-volume (ABV).

P20. A method according to claim P19, further comprising pressurizing the ethanol concentration system to within a pressure range of 1500 psi to 3000 psi while blocking the portion of the retentate outlet of the second pressure vessel.

P21. A method according to claim P20, further comprising, after pressurizing the ethanol concentration system to within the pressure range, unblocking the retentate outlet and obtaining the retentate.

P22. A method according to claim P21, wherein obtaining the retentate includes directing the retentate to a product tank coupled to the retentate outlet.

P23. A method according to any one of claims P19 to P22, wherein each of the reverse osmosis pressure vessels further includes a filter membrane therein, the filter membrane including membrane leaves separated by a spacer having a thickness of between about 0.0015 to about 0.027 inches.

P24. A method according to claim P23, wherein the spacer is a feed spacer having a thickness of between about 0.010 inches to about 0.027 inches.

P25. A method according to claim P23, wherein the spacer comprises printed dots, lines or patterns formed on a surface of the membrane leaves.

P26. A method according to claim P25, wherein the spacer has a thickness of between about 0.0015 inches to about 0.020 inches.

P27. A method according to any one of claims P19 to P26, further comprising filtering sediment going into the feed inlet of the first pressure vessel and/or out from the retentate outlet of the second pressure vessel.

P28. A method for reducing beverage loss after ceasing concentration and during unloading of beverage out of an ethanol concentration system, the ethanol concentration system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:
coupling the retentate outlet of a first pressure vessel of the set of reverse osmosis pressure vessels to a feed tank, the feed tank coupled to a feed inlet of a second pressure vessel of the set of reverse osmosis pressure vessels, the second pressure vessel preceding the first pressure vessel;
feeding deaerated water to the feed inlet of the second pressure vessel such that a portion of the retentate from the retentate outlet is diverted to the feed tank, the portion being in a range of 50% to 100%; and
decoupling the retentate outlet from the feed tank while feeding deaerated water to the feed inlet of the second pressure vessel.

P29. A method according to claim P28, further comprising, after decoupling the retentate outlet from the feed tank, coupling the retentate outlet to a drain while feeding deaerated water to the feed inlet of the second pressure vessel.

P30. A method according to any one of claims P28 to P29, wherein each of the reverse osmosis pressure vessels further includes a filter membrane therein, the filter membrane including membrane leaves separated by a spacer having a thickness of between about 0.0015 to about 0.027 inches.

P31. A method according to claim P30, wherein the spacer is a feed spacer having a thickness of between about 0.010 inches to about 0.027 inches.

P32. A method according to claim P30, wherein the spacer comprises printed dots, lines or patterns formed on a surface of the membrane leaves.

P33. A method according to claim P32, wherein the spacer has a thickness of between about 0.0015 inches to about 0.020 inches.

P34. A method according to any one of claims P28 to P33, further comprising filtering sediment going into the feed inlet of the first pressure vessel and/or out from the retentate outlet of the second pressure vessel.

P35. A method for reducing beverage loss during unloading of beverage out of an ethanol concentration system, the ethanol concentration system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:
feeding deaerated water to the feed inlet of a first pressure vessel of the set of reverse osmosis pressure vessels while operating the ethanol concentration system;
monitoring an alcohol percentage of the retentate outlet of a second pressure vessel of the set of reverse osmosis pressure vessels, the second pressure vessel coupled directly or indirectly to the first pressure vessel; and
coupling a retentate from the retentate outlet of the second pressure vessel to a feed tank coupled to the feed inlet of the first pressure vessel when the alcohol percentage is within a target range of 15% to 30% ABV.

P36. A method according to claim P35, wherein each of the reverse osmosis pressure vessels further includes a filter membrane therein, the filter membrane including membrane leaves separated by a spacer having a thickness of between about 0.0015 to about 0.027 inches.

P37. A method according to claim P36, wherein the spacer is a feed spacer having a thickness of between about 0.010 inches to about 0.027 inches.

P38. A method according to claim P36, wherein the spacer comprises printed dots, lines or patterns formed on a surface of the membrane leaves.

P39. A method according to claim P38, wherein the spacer has a thickness of between about 0.0015 inches to about 0.020 inches.

P40. A method according to any one of claims P35 to P39, further comprising filtering sediment going into the feed inlet of the first pressure vessel and/or out from the retentate outlet of the second pressure vessel.

P41. An ethanol concentration system for reducing beverage loss during loading or unloading of a beverage into or from the ethanol concentration system, the ethanol concentration system comprising:
- a set of reverse osmosis pressure vessels, each pressure vessel having a feed inlet, a retentate outlet, and a permeate outlet, the pressure vessels coupled so that each successive pressure vessel has its feed inlet coupled to the retentate outlet of its preceding pressure vessel;
- a fluid line configured to be coupled to the feed inlet of a first pressure vessel of the set of reverse osmosis pressure vessels and configured to permit deaerated water into the first pressure vessel;
- a feed tank configured to be coupled to the feed inlet of the first pressure vessel of the set of reverse osmosis pressure vessels and configured to be coupled to or decoupled from the retentate outlet of a second pressure vessel of the set of reverse osmosis pressure vessels, the second pressure vessel coupled directly or indirectly to the first pressure vessel;
- one or more sensors configured to detect an alcohol percentage at the retentate outlet of the second pressure vessel; and
- a controller in communication with the one or more sensors and the feed tank, wherein the controller is configured (a) to allow the retentate outlet of the second pressure vessel to be coupled to the feed tank when the one or more sensors detect that the alcohol percentage is within a first target range and (b) to allow the retentate outlet of the second pressure vessel to be decoupled from the feed tank and coupled to a drain when the one or more sensors detect that the alcohol percentage is within a second target range, the second target range different from the first target range.

P42. An ethanol concentration system according to claim P41, wherein the controller includes two or more controllers.

P43. An ethanol concentration system according to any one of claims P41 to P42, wherein the controller actuates one or more valves.

P44. An ethanol concentration system according to any one of claims P41 to P43, wherein the one or more sensors include an inline sound velocity sensor, an inline refractive index sensor, an inline near infrared sensor, and/or an inline density sensor.

P45. An ethanol concentration system according to any one of claims P41 to P44, wherein each of the reverse osmosis pressure vessels further includes a filter membrane therein, the filter membrane including membrane leaves separated by a spacer having a thickness of between about 0.0015 to about 0.027 inches.

P46. An ethanol concentration system according to claim P45, wherein the spacer is a feed spacer having a thickness of between about 0.010 inches to about 0.027 inches.

P47. An ethanol concentration system according to claim P45, wherein the spacer comprises printed dots, lines or patterns formed on a surface of the membrane leaves.

P48. An ethanol concentration system according to claim P45, wherein the spacer has a thickness of between about 0.0015 inches to about 0.020 inches.

P49. An ethanol concentration system according to any one of claims P41 to P48, further comprising a trap filter configured to be coupled to the feed inlet of the first pressure vessel and/or the retentate outlet of the second pressure vessel, the trap filter configured to collect sediment from the beverage.

P50. A method for reducing beverage loss during loading of beverage into a water removal system, the water removal system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:
- feeding deaerated water into the feed inlet of a first pressure vessel of the set of reverse osmosis pressure vessels;
- feeding the beverage into the feed inlet of the first pressure vessel;
- monitoring an alcohol percentage and/or a real extract percentage at the retentate outlet of a second pressure vessel of the set of reverse osmosis pressure vessels, the second pressure vessel coupled directly or indirectly to the first pressure vessel; and
- coupling a retentate from the retentate outlet of the second pressure vessel to a feed tank coupled to the feed inlet of the first pressure vessel when the alcohol percentage is within a first target range of 0.5 to 18% alcohol-by-volume (ABV) and/or when the real extract percentage is within a second target range of 1% to 50%.

P51. A water removal system for reducing beverage loss during loading or unloading of a beverage into or from the water removal system, the water removal system comprising:
- a set of reverse osmosis pressure vessels, each pressure vessel having a feed inlet, a retentate outlet, and a permeate outlet, the pressure vessels coupled so that each successive pressure vessel has its feed inlet coupled to the retentate outlet of its preceding pressure vessel;
- a fluid line configured to be coupled to the feed inlet of a first pressure vessel of the set of reverse osmosis pressure vessels and configured to permit deaerated water into the first pressure vessel;
- a feed tank configured to be coupled to the feed inlet of the first pressure vessel of the set of reverse osmosis pressure vessels and configured to be coupled to or decoupled from the retentate outlet of a second pressure vessel of the set of reverse osmosis pressure vessels, the second pressure vessel coupled directly or indirectly to the first pressure vessel;
- one or more sensors configured to detect an alcohol percentage and/or a real extract percentage at the retentate outlet of the second pressure vessel; and
- a controller in communication with the one or more sensors and the feed tank, wherein the controller is configured (a) to allow the retentate outlet of the second pressure vessel to be coupled to the feed tank when the one or more sensors detect that the alcohol percentage and/or the real extract percentage is within a first target range and (b) to allow the retentate outlet of the second pressure vessel to be decoupled from the feed tank and coupled to a drain or product tank when the one or more sensors detect that the alcohol percentage and/or the real extract percentage is within a second target range, the second target range different from the first target range.

The embodiments of the present invention described above are intended to be merely exemplary; numerous variations and modifications will be apparent to those skilled in the art. All such variations and modifications are intended to be within the scope of the present invention as defined in the appended claims.

What is claimed is:

1. A method for reducing beverage loss after ceasing concentration and during unloading of beverage out of an ethanol concentration system, the ethanol concentration system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:
    coupling the retentate outlet of a first pressure vessel of the set of reverse osmosis pressure vessels to a feed tank, the feed tank coupled to a feed inlet of a second pressure vessel of the set of reverse osmosis pressure vessels, the second pressure vessel preceding the first pressure vessel;
    feeding deaerated water to the feed inlet of the second pressure vessel such that a portion of the retentate from the retentate outlet of the first pressure vessel is diverted to the feed tank, the portion being in a range of 50% to 100%; and
    decoupling the retentate outlet of the first pressure vessel from the feed tank while feeding deaerated water to the feed inlet of the second pressure vessel.

2. A method according to claim 1, further comprising, after decoupling the retentate outlet of the first pressure vessel from the feed tank, coupling the retentate outlet of the first pressure vessel to a drain while feeding deaerated water to the feed inlet of the second pressure vessel.

3. A method according to claim 2, wherein each of the reverse osmosis pressure vessels further includes a filter membrane therein, the filter membrane including membrane leaves separated by a spacer having a thickness of between about 0.0015 to about 0.027 inches.

4. A method according to claim 2, further comprising filtering sediment going into the feed inlet of the first pressure vessel and/or out from the retentate outlet of the second pressure vessel.

5. A method according to claim 1, wherein each of the reverse osmosis pressure vessels further includes a filter membrane therein, the filter membrane including membrane leaves separated by a spacer having a thickness of between about 0.0015 to about 0.027 inches.

6. A method according to claim 5, wherein the spacer is a feed spacer having a thickness of between about 0.010 inches to about 0.027 inches.

7. A method according to claim 6, further comprising filtering sediment going into the feed inlet of the first pressure vessel and/or out from the retentate outlet of the second pressure vessel.

8. A method according to claim 5, wherein the spacer comprises printed dots, lines or patterns formed on a surface of the membrane leaves.

9. A method according to claim 8, wherein the spacer has a thickness of between about 0.0015 inches to about 0.020 inches.

10. A method according to claim 9, further comprising filtering sediment going into the feed inlet of the first pressure vessel and/or out from the retentate outlet of the second pressure vessel.

11. A method according to claim 8, further comprising filtering sediment going into the feed inlet of the first pressure vessel and/or out from the retentate outlet of the second pressure vessel.

12. A method according to claim 5, further comprising filtering sediment going into the feed inlet of the first pressure vessel and/or out from the retentate outlet of the second pressure vessel.

13. A method according to claim 1, further comprising filtering sediment going into the feed inlet of the first pressure vessel and/or out from the retentate outlet of the second pressure vessel.

14. A method for reducing beverage loss during loading of beverage into a water removal system, the water removal system having a set of reverse osmosis pressure vessels, each pressure vessel having a feed inlet, a retentate outlet, and a permeate outlet, the pressure vessels being coupled so that each successive pressure vessel has its feed inlet coupled to the retentate outlet of its preceding pressure vessel, the method comprising:
    feeding deaerated water into the feed inlet of a first pressure vessel of the set of reverse osmosis pressure vessels;
    feeding the beverage into the feed inlet of the first pressure vessel;
    monitoring an alcohol percentage and/or a real extract percentage at the retentate outlet of a second pressure vessel of the set of reverse osmosis pressure vessels, the second pressure vessel coupled directly or indirectly to the first pressure vessel; and
    coupling a retentate from the retentate outlet of the second pressure vessel to a feed tank coupled to the feed inlet of the first pressure vessel when the alcohol percentage is within a first target range of 0.5 to 18% alcohol-by-volume (ABV) and/or when the real extract percentage is within a second target range of 1% to 50%.

15. A water removal system for reducing beverage loss during loading or unloading of a beverage into or from the water removal system, the water removal system comprising:
    a set of reverse osmosis pressure vessels, each pressure vessel having a feed inlet, a retentate outlet, and a permeate outlet, the pressure vessels coupled so that each successive pressure vessel has its feed inlet coupled to the retentate outlet of its preceding pressure vessel;
    a fluid line configured to be coupled to the feed inlet of a first pressure vessel of the set of reverse osmosis pressure vessels and configured to permit deaerated water into the first pressure vessel;
    a feed tank configured to be coupled to the feed inlet of the first pressure vessel of the set of reverse osmosis pressure vessels and configured to be coupled to or decoupled from the retentate outlet of a second pressure vessel of the set of reverse osmosis pressure vessels, the second pressure vessel coupled directly or indirectly to the first pressure vessel;
    one or more sensors configured to detect an alcohol percentage and/or a real extract percentage at the retentate outlet of the second pressure vessel; and a controller in communication with the one or more sensors and the feed tank, wherein the controller is configured (a) to allow the retentate outlet of the second pressure vessel to be coupled to the feed tank when the one or more sensors detect that the alcohol percentage and/or the real extract percentage is within a first target range and (b) to allow the retentate outlet of the second pressure vessel to be decoupled from the feed tank and coupled to a drain or product tank when the one or more sensors detect that the alcohol percentage and/or the real extract percentage is within a second target range, the second target range different from the first target range.

* * * * *